US012321118B2

(12) United States Patent
Matsuda et al.

(10) Patent No.: US 12,321,118 B2
(45) Date of Patent: Jun. 3, 2025

(54) FIXING MEMBER AND FIXING UNIT

(71) Applicant: Canon Kabushiki Kaisha, Tokyo (JP)

(72) Inventors: Tomoki Matsuda, Shizuoka (JP); Takaaki Tsuruya, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/393,796

(22) Filed: Dec. 22, 2023

(65) Prior Publication Data

US 2024/0219862 A1 Jul. 4, 2024

(30) Foreign Application Priority Data

Dec. 28, 2022 (JP) ................................ 2022-211851

(51) Int. Cl.
*G03G 15/20* (2006.01)

(52) U.S. Cl.
CPC ..... *G03G 15/2057* (2013.01); *G03G 15/2042* (2013.01); *G03G 15/2053* (2013.01)

(58) Field of Classification Search
CPC ........... G03G 15/2017; G03G 15/2042; G03G 15/2053; G03G 15/2057
See application file for complete search history.

(56) References Cited

U.S. PATENT DOCUMENTS

| | | | |
|---|---|---|---|
| 7,158,748 B2 | 1/2007 | Kwak et al. | |
| 8,112,023 B2 | 2/2012 | Seo et al. | |
| 9,618,889 B2 | 4/2017 | Nishizawa et al. | |
| 9,658,584 B2 | 5/2017 | Nishimura | |
| 2003/0213799 A1 | 11/2003 | Tanaka et al. | |
| 2006/0237445 A1 | 10/2006 | Nagahira et al. | |
| 2008/0061054 A1 | 3/2008 | Shirakata et al. | |
| 2009/0317157 A1 | 12/2009 | Murakami | |
| 2015/0168896 A1* | 6/2015 | Yonekubo | G03G 15/2053 399/329 |
| 2016/0109835 A1* | 4/2016 | Kurata | G03G 15/2042 399/67 |
| 2016/0370743 A1* | 12/2016 | Nishimura | G03G 15/2053 |
| 2020/0073302 A1 | 3/2020 | Fujimoto | |
| 2023/0324839 A1* | 10/2023 | Iwasawa | 399/328 |

FOREIGN PATENT DOCUMENTS

| | | |
|---|---|---|
| JP | 2014026267 A | 2/2014 |
| JP | 2015118232 A | 6/2015 |
| JP | 2017009710 A | 1/2017 |

OTHER PUBLICATIONS

Extended European Search Report issued Apr. 15, 2024 in counterpart European Patent Appln. No. 23219139.5.

* cited by examiner

*Primary Examiner* — Sophia S Chen
(74) *Attorney, Agent, or Firm* — Venable LLP

(57) ABSTRACT

A fixing member includes a conductive layer including a plurality of conductive elements. In a direction of a generatrix of the fixing member, when an area through which a recording material with a maximum width conveyable to the fixing member passes is referred to as a first area, the first area includes a central area and an end portion area. The central area includes a central portion of the first area in the direction of the generatrix. The end portion area includes an end portion of the first area in the direction of the generatrix. A resistance value of each of the plurality of conductive elements disposed in the central area is a first resistance value. A resistance value of each of the plurality of conductive elements disposed in the end portion area is a second resistance value that is lower than the first resistance value.

16 Claims, 12 Drawing Sheets

FIXING MEMBER AND FIXING UNIT

BACKGROUND OF THE INVENTION

Field of the Invention

This disclosure relates to a fixing member heating a toner image borne on a recoding material, and a fixing unit including this.

Description of the Related Art

Generally, as fixing units that are mounted to copiers and printers of an electrophotographic system, fixing units of an electromagnetic induction heating method are known. For example, in Japanese Patent Laid-Open No. 2014-026267, a fixing unit including a fixing film incorporating a conductive layer, a magnetic core disposed in an internal space of the fixing film, and a helical coil entwined around the magnetic core is described. When an alternating current flows through the coil, an alternating magnetic field is created, and, due to the principle of electromagnetic induction, a circulating current flows through a heating layer.

Further, in Japanese Patent Laid-Open No. 2015-118232, a fixing unit formed by a plurality of electrically disconnected heating layers, in which a heating layer disposed on a sleeve is disconnected in a rotational axis direction of the sleeve, is described. In this fixing unit, a magnetic core which has a shape having ends is arranged in an internal space of the sleeve, and magnetic flux density inside of the magnetic core progressively decreases from a central portion toward end portions of the magnetic core in the rotational axis direction of the sleeve. Therefore, in the plurality of disconnected heating layers, there is a tendency that a heat generation amount is likely to decrease toward the end portions in the rotational axis direction.

In Japanese Patent Laid-Open No. 2017-009710, a fixing unit including a fixing sleeve that incorporates a conductive layer, a magnetic core that is disposed in an internal space of the fixing sleeve, and a helical coil that is entwined around the magnetic core is described. So as to uniformize a heating distribution in a rotational axis direction of the fixing sleeve, the coil is configured such that winding intervals in the end portions in the rotational axis direction become narrower.

However, in the fixing unit described in the Japanese Patent Laid-Open No. 2017-009710, as a result of narrowing the winding intervals in the end portions in the rotational axis direction of the coil, the number of coil windings increases. Thereby, there is a possibility that a heat generation amount of the coil itself may increase, and this may lead to a decrease in energy efficiency.

SUMMARY OF THE INVENTION

According to a first aspect of the present invention, a fixing member configured to heat a toner image borne on a recording material and formed in a rotatable tubular shape includes a conductive layer configured to generate heat by an induced electromotive force when an alternating magnetic field is created, the conductive layer including a plurality of conductive elements that are electrically disconnected each other in a direction of a generatrix of the fixing member. In the direction of the generatrix, when an area through which the recording material with a maximum width conveyable to the fixing member passes is referred to as a first area, the first area includes a central area and an end portion area. The central area includes a central portion of the first area in the direction of the generatrix. The end portion area includes an end portion of the first area in the direction of the generatrix. A resistance value of each of the plurality of conductive elements disposed in the central area is a first resistance value. A resistance value of each of the plurality of conductive elements disposed in the end portion area is a second resistance value that is lower than the first resistance value.

According to a second aspect of the present invention, a fixing member configured to heat a toner image borne on a recording material and formed in a rotatable tubular shape includes a conductive layer configured to generate heat by an induced electromotive force when an alternating magnetic field is created, the conductive layer including a plurality of conductive elements that are electrically disconnected each other in a direction of a generatrix of the fixing member. In the direction of the generatrix, when an area through which the recording material with a maximum width conveyable to the fixing member passes is referred to as a first area, in the direction of the generatrix, when an area through which the recording material with a maximum width conveyable to the fixing member passes is referred to as a first area.

Further features of the present invention will become apparent from the following description of exemplary embodiments with reference to the attached drawings.

DESCRIPTION OF THE EMBODIMENTS

Hereinafter, with reference to drawings, embodiments of this disclosure will be described. In this disclosure, an image forming apparatus is not limited to a single function printer incorporating only a printing function, but includes a wide range of apparatuses forming an image on a recording material, such as copy machines incorporating a copy function, multifunction machines incorporating a plurality of functions, and large size printing machines for commercial use.

Further, in this disclosure, a fixing unit includes a wide range of apparatuses (image heating apparatuses) that fix the image (toner image) formed on the recording material by such as an electrophotographic process on the recording material by heating the image. It is acceptable that the fixing unit is arranged to reheat the image, which has been already fixed (primarily fixed) on the recording material, so as to add gloss.

Example 1

Image Forming Apparatus

Figure 1:
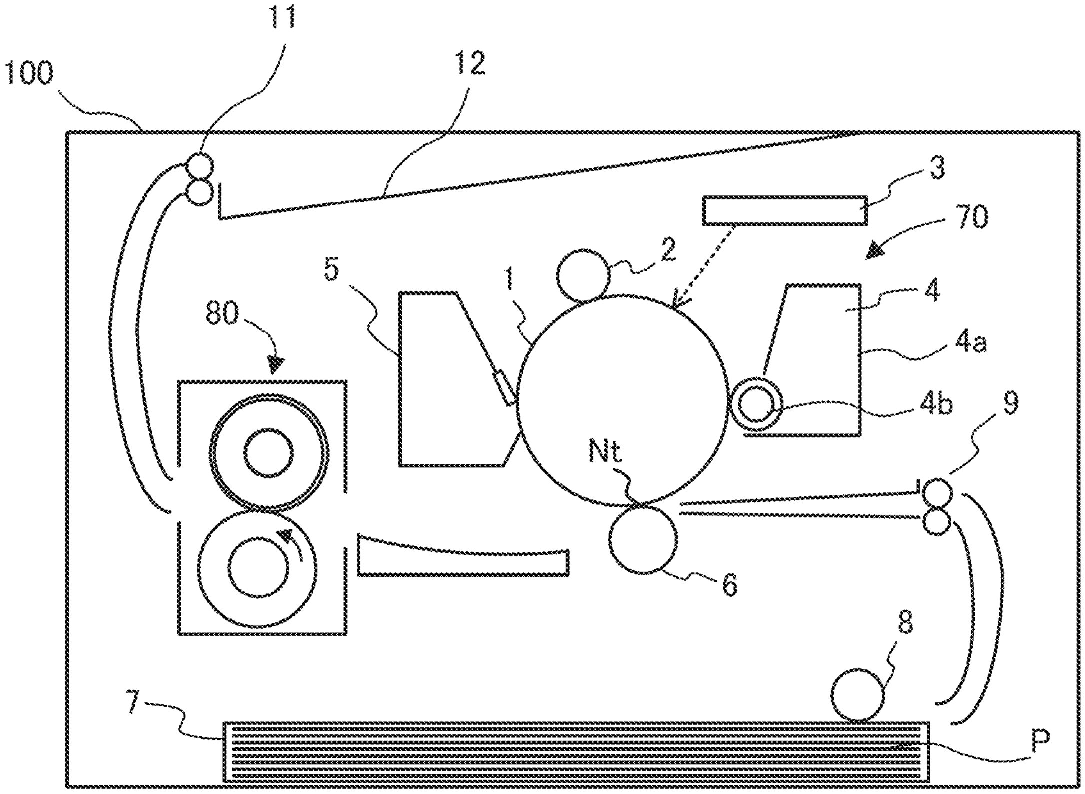
FIG. 1 is an overall schematic diagram illustrating a printer of an example 1.

With reference to FIG. 1, an overall configuration of the image forming apparatus of an example 1 of this disclosure will be described. FIG. 1 is a cross-sectional view illustrating a schematic configuration of a laser beam printer (hereinafter, referred to as a printer 100) that is the image forming apparatus according to an embodiment of this disclosure. Based on image information received from an external apparatus such as a personal computer, the printer 100 performs an image forming operation of forming the image on the recording material P. As the recording material P, it is possible to use various types of sheet materials with differing sizes and materials. The recording material P includes paper such as regular paper and cardboard, a surface treated sheet material such as coated paper, a specially shaped sheet such as an envelope and index paper, a plastic film, cloth, and the like.

The printer 100 includes an image forming unit 70 that forms the image (toner image) on the recording material P by the electrophotographic process, and a fixing unit 80 that fixes the image on the recording material P.

The image forming unit 70 includes a photosensitive drum 1, serving as an image bearing member, a charge roller 2, serving as a charging unit, a laser scanner 3, serving as an exposing unit, and a developing unit 4, serving as a developing unit. Further, the image forming unit 70 includes a transfer roller 6, serving as a transfer unit, and a cleaner 5, serving as a cleaning unit. The photosensitive drum 1 is a photosensitive member formed in a cylindrical shape. The developing unit 4 includes a container 4*a* storing toner used as developer, and a developing roller 4*b* that carries and supplies the toner to the photosensitive drum 1.

In the image forming operation, the photosensitive rum 1 is rotatably driven, and the charge roller 2 uniformly charges a surface of the photosensitive drum 1. When a digital image signal, generated based on the image information by an image processing unit incorporated in the printer 100, is input, the laser scanner 3 irradiates and exposes the photosensitive drum 1 with a laser beam, and writes an electrostatic latent image corresponding to the image information on the surface of the photosensitive drum 1. The developing unit 4 supplies the toner to the photosensitive drum 1, and develops the electrostatic latent image to the toner image.

In parallel with the creation of the toner image, the conveyance of the recording material Pis performed. In a lower part of the printer 100, a cassette 7 is housed drawably. The recording material Pis stored in the cassette 7 in a state of being stacked. The recording material P stored in the cassette 7 is fed by a feed roller 8, serving as a feed unit, one sheet at a time, and conveyed to a transfer nip portion Nt by a conveyance roller pair 9.

The transfer roller 6 transfers the toner image from the photosensitive drum 1 onto the recording material P at the transfer nip portion Nt between the photosensitive drum 1 and the transfer roller 6. A foreign substance such as a transfer residual toner that has not been transferred and remained on the photosensitive drum 1 is collected by the cleaner 5.

The recording material P that has passed through the transfer nip portion Nt is sent to the fixing unit 80. The fixing unit 80 fixes the image on the recording material P by heating and pressing the image (toner image) on the recording material P, while conveying the recording material P. Details of the fixing unit 80 will be described below. The recording material P that has passed through the fixing unit 80 is discharged to a sheet discharge tray 12 by a sheet discharge roller pair 11.

While, in this example, the image forming unit of a direct transfer system is described, it is acceptable to use an image forming unit of an intermediate transfer system in which the toner image is primarily transferred from the image bearing member onto an intermediate transfer member, such as an intermediate transfer belt, and the toner image is secondarily transferred from the intermediate transfer member onto the recording material P. Further, it is acceptable to use an image forming unit that forms a color image using toners of a plurality of colors.

Fixing Unit

Figure 2:
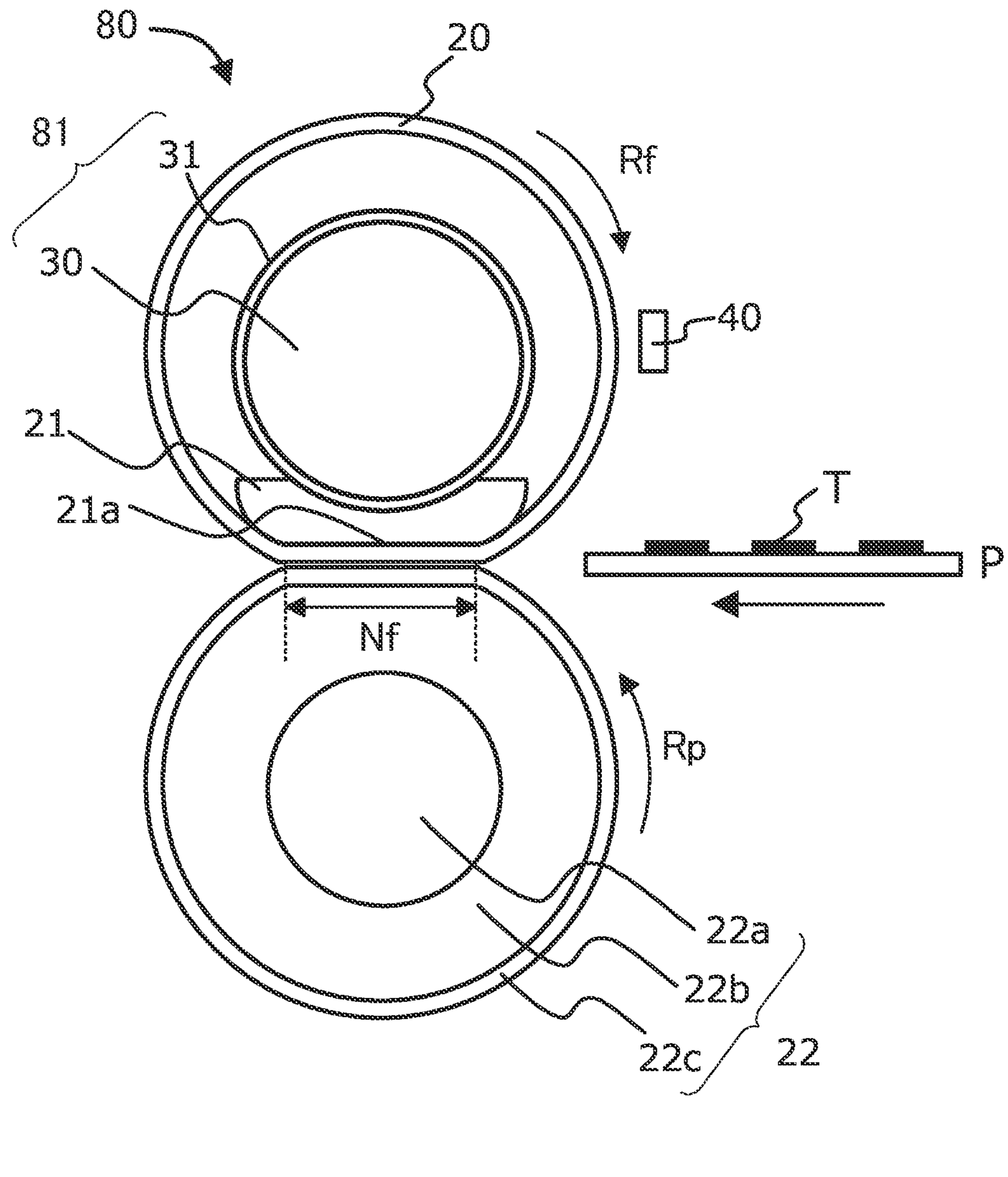
FIG. 2 is a cross-sectional view illustrating a fixing unit.

The fixing unit 80 will be described. The fixing unit 80 in this example is a fixing unit of an electromagnetic induction heating method. FIG. 2 is a cross-sectional view illustrating the fixing unit 80.

As illustrated in FIG. 2, the fixing unit 80 includes a fixing film 20, a nip portion forming member 21, a pressing roller 22, serving as a pressing member, a magnetic field generating unit 81 forming an alternating magnetic field in a direction of a generatrix of the fixing film 20, and a temperature sensor 40.

The fixing film 20, serving as a fixing member and a rotary member, is formed by a tubular (endless) film having flexibility. The fixing film 20 is an example of a fixing member that can rotate while heating the image on the recording material. The nip portion forming member 21 is formed from such as a heat resistant resin, and is inserted in an internal space of the fixing film 20. The nip portion forming member 21 includes a plane 21*a* that comes into contact with and slides along an inner surface (inner circumferential surface) of the fixing film 20. The pressing roller 22 is brought into contact with the nip portion forming member 21 across the fixing film 20, and forms a nip portion Nf (fixing nip) with the plane 21*a* of the nip portion forming member 21 in between.

The pressing roller 22 includes a core metal 22*a*, an elastic layer 22*b* formed on an outer surface of the core metal 22*a*, and a release layer 22*c* formed on an outer surface of the elastic layer. In this example, an outer diameter of the pressing roller 22 is 30 millimeters (mm).

The magnetic field generating unit 81 includes a magnetic core 30, serving as a magnetic member, and an exciting coil 31, serving as a coil. When an alternating current flows through the exciting coil 31, an alternating magnetic field is created, and an electrical current in a circumferential direction is induced through a conductive layer 20*b* (refer to FIG. 3B) of the fixing film 20 by the alternating magnetic field.

All of the fixing film 20, the magnetic core 30, the pressing roller 22, and the nip portion forming member 21 are members that are long in a longitudinal direction LD (refer to FIG. 4) of the fixing film 20. In other words, the longitudinal direction LD can be also referred to as the direction of the generatrix of the fixing film 20. In length in the longitudinal direction LD, the fixing film 20, the magnetic core 30, the press roller 22, and the nip portion forming member 21 each are longer than a maximum width of the recording material P conveyable to the fixing unit 80.

Figure 6A:
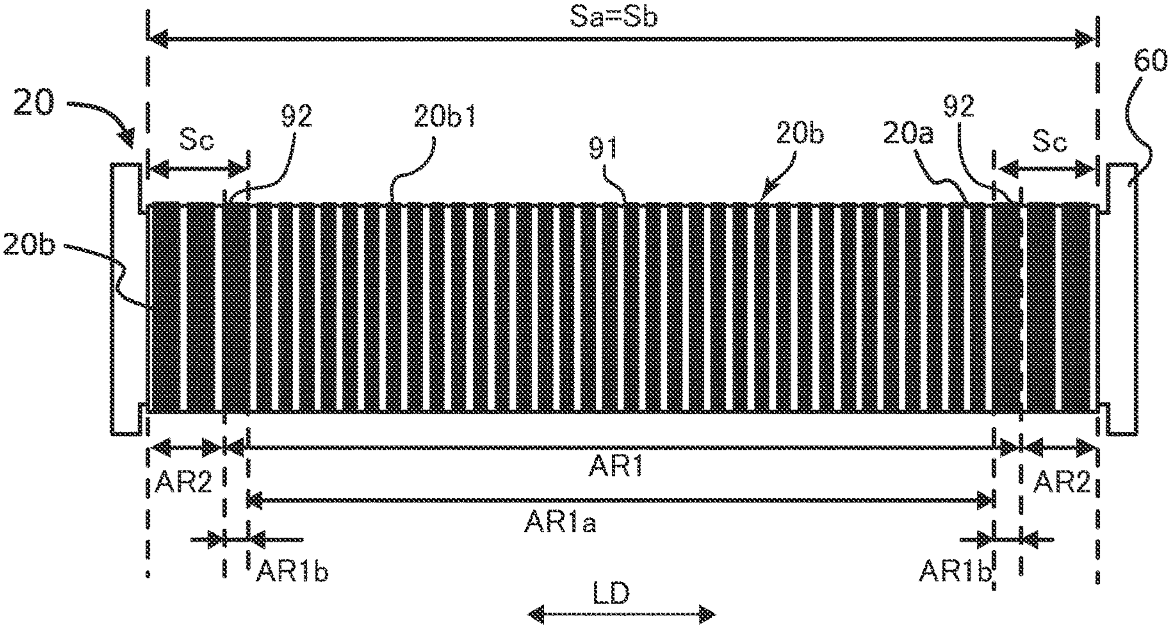
FIG. 6A is a diagram schematically illustrating a disconnection pattern of the conductive layer in the example 1.

The fixing unit 80 includes a frame, not shown, that supports both ends in the longitudinal direction LD of the nip portion forming member 21 and supports flange members 60 (refer to FIG. 6A). The frame rotatably support a shaft portion of the core metal 22*a* of the pressing roller 22 through bearing members, not shown. The pressing roller 22 is pressed toward the nip portion forming member 21 by an urging member such as a pressing spring, not shown. In this example, the aforementioned urging member presses the bearing members disposed at both end portions of the pressing roller 22 with a pressing force of approximately 196 newtons (N) to 392 N (approximately 20 kilogram-force (kgf) to 40 kgf) as a total pressure. Thereby, the elastic layer 22*b* of the pressing roller 22 collapses, and undergoes elastic deformation, so that the nip portion Nf with a predetermined width is formed by surfaces of the fixing film 20 and the pressing roller 22.

To be noted, while, in this example, the pressing roller 22 is urged toward the nip portion forming member 21, it is not limited to this. For example, it is acceptable that the nip portion forming member 21 is urged toward the pressing roller 22 by an urging member.

Figure 3A:
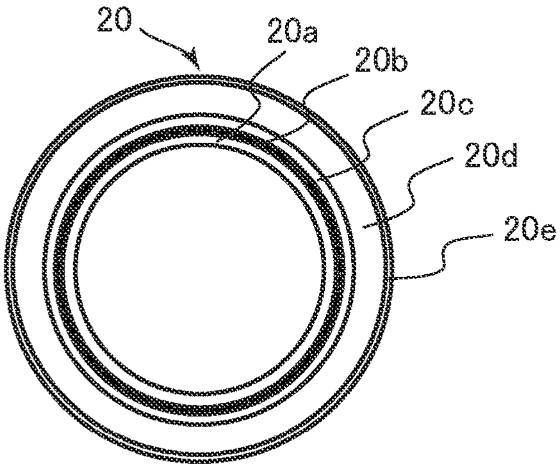
FIG. 3A is a cross-sectional view illustrating a cross section of an area in which a conductive layer of a fixing film exists.
Figure 3B:
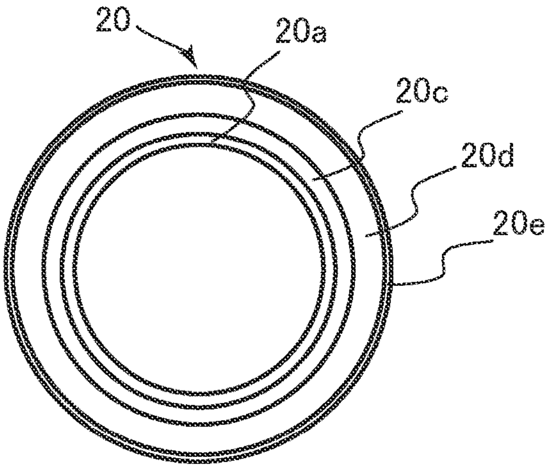
FIG. 3B is a cross-sectional view illustrating a cross section of an area in which the conductive layer of the fixing film does not exist.
Figure 3C:
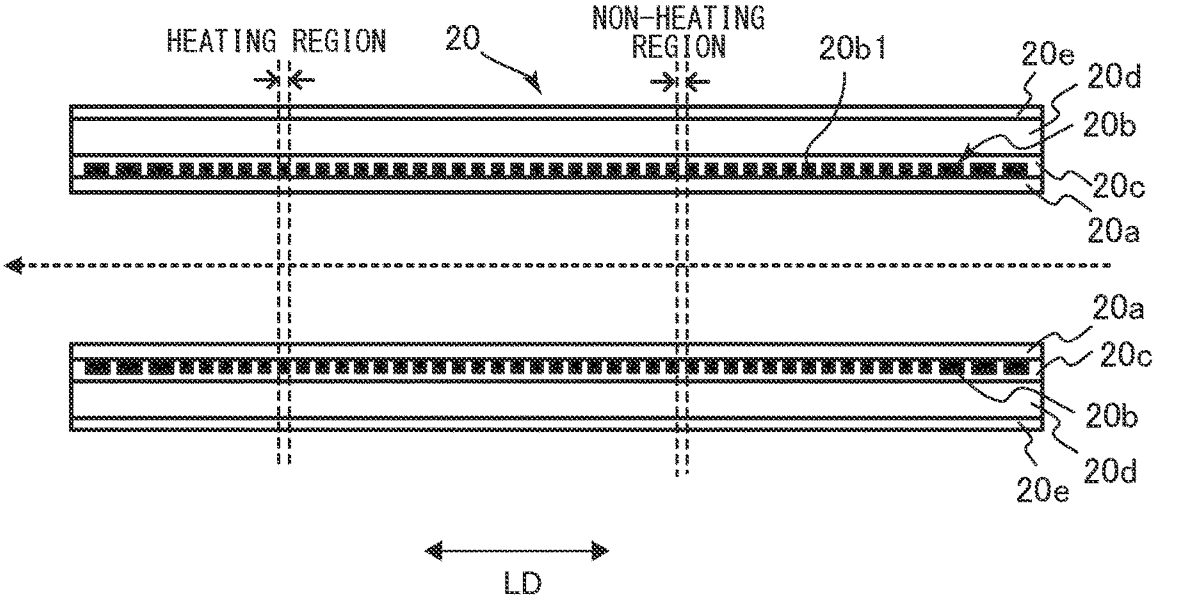
FIG. 3C is a cross-sectional view illustrating a cross section that is parallel to a longitudinal direction of the fixing film.

Next, the fixing film 20 of this example will be described in detail. The fixing film 20 is formed in a cylindrical shape with a diameter of 10 to 100 mm, and, in this example, the fixing film 20 with an outer diameter of 30 mm is used. FIG. 3A is a cross-sectional view illustrating a region (hereinafter referred to as a heating region) in which the conductive layer 20*b* of the fixing film 20 exists, and FIG. 3B is a cross-sectional view illustrating a region (hereinafter referred to as a non-heating region) in which the conductive layer 20*b* of the fixing film 20 does not exist. FIG. 3C is a cross-sectional view illustrating a cross section parallel to the longitudinal direction LD of the fixing film 20.

As illustrated in FIG. 3C, the heating and non-heating regions intermittently exist in the fixing film 20 in the longitudinal direction LD. In other words, the heating and non-heating regions are alternately disposed in the fixing film 20 in the longitudinal direction LD.

In the heating region, the fixing film 20 includes a layered structure incorporating a base layer 20*a*, the conductive layer 20*b*, a protective layer 20*c*, the elastic layer 20*d*, and the release layer 20*e*. The base, conductive, protective, elastic, and the release layers 20*a*, 20*b*, 20*c*, 20*d*, and 20*e* are laminated in this order from an inner circumferential side toward an outer circumferential side of the fixing film 20 in a thickness direction.

The base layer 20*a* is suitably made from a material with non-magnetic properties, a high volumetric electrical resistivity, and superior thermal stability. For example, the material of the base layer 20*a* is such as a heat resistant resin represented by polyimide (PI), polyamideimide (PAI), and the like, and a fiber reinforced resin represented by a carbon fiber reinforced polymer (CFRP), a glass fiber reinforced polymer (GFRP), and the like. In a case where the heat resistance resin is used for the base layer 20*a*, it is preferred that the thickness of the base layer 20*a* is set such that the strength of the fixing film 20, the slideability of the nip portion Nf, and the rotational stability of the fixing film 20 can be easily obtained, and a range of 20 to 200 micrometers (μm) is suitable. In this example, the base layer 20*a* is formed of polyimide (PI), and the thickness is set to 50 μm.

A metal with a low volumetric electrical resistivity, such as gold, silver, copper, iron, platinum, tin, stainless steel (SUS), titan, aluminum, and nickel is suitable as the material of the conductive layer 20*b* formed on an outer surface of the base layer 20*a*. In this example, copper with a volumetric electrical resistivity of $1.7\times10^{-8}$ ohm-meter (Ωm) (at room temperature) is used, and the thickness of the conductive layer 20*b* is set to 3 μm. Further, as illustrated in FIG. 3C, the conductive layer 20*b* is formed by a plurality of conductive elements 20*b*1 electrically disconnected each other in the longitudinal direction LD.

Hereinafter, an example of a forming method of the conductive layer 20*b* will be described. First, a paint containing micro-particles of the aforementioned metal and polyimide precursor solution is prepared, and a coating film is formed by applying this paint onto the outer surface of the base layer 20*a* using a method such as blade or screen printing. When applying the paint onto the outer surface of the base layer 20*a*, disconnected sections in which the conductive layer 20*b* is electrically disconnected at predetermined intervals in the longitudinal direction are formed on the base layer 20*a* in advance using a method such as general masking processing. Thereafter, by gradually heating and drying the aforementioned coating to approximately 300° C. to 500° C. and progressing imidization, the base layer 20*a* and the coating are firmly adhered to each other, and the plurality of conductive elements 20*b*1 electrically disconnected each other in the longitudinal direction LD are formed. Other than the technique described above, it is acceptable to form the conductive element 20*b*1 using a technique such as laser etching or chemical etching after the outer surface of the base layer 20*a* has been plated with the aforementioned metal.

On an outer surface of the conductive layer 20*b*, the protective layer 20*c* is formed for a purpose of protecting the conductive element 20*b*1. As for the material of the protective layer 20*c*, similar to the base layer 20*a*, a material with the non-magnetic properties, the high volumetric electrical resistivity, and the superior thermal stability is suitable. For example, the material of the protective layer 20*c* is such as the heat resistant resin represented by polyimide (PI), polyamideimide (PAI), and the like, and the fiber reinforced resin represented by the carbon fiber reinforced polymer (CFRP), the glass fiber reinforced polymer (GFRP), and the like. A thickness of 20 to 200 μm is suitable for the protective layer 20*c* to easily ensure the rotational stability of the fixing film 20. In this example, the protective layer 20*c* is formed of polyimide (PI), and the thickness of the protective layer 20*c* is set to 50 μm.

On an outer surface of the protective layer 20*c*, the elastic layer 20*d* made from a heat resistance elastic material such as a silicone rubber is formed. In this example, the elastic layer 20*d* is formed from a good thermal conductivity silicone rubber, and thickness is 200 μm.

Further, on the outer surface of the elastic layer 20*d*, the release layer 20*e* is formed for a purpose of preventing the adhesion of the toner onto the surface of the fixing film 20 and the occurrence of image defects. The material that excels in non-adhesiveness is suitable for the release layer 20*e*, and it is preferable to use such as tetrafluoroethylene-perfluoroalkyl vinyl ether (PFA), poly tetrafluoroethylene (PTFE), tetrafluoroethylene-hexafluoropropylene (FEP), and tetrafluoroethylene-ethylene (ETFE). In this example, the release layer 20*e* is formed from PFA, and thickness is set to 15 μm.

On the other hand, as illustrated in FIG. 3B, the fixing film 20 includes the layered structure incorporating the base, protective, elastic, and release layers 20*a*, 20*c*, 20*d*, and 20*e* in the non-heating region. In the fixing film 20, the conductive layer 20*b* does not exist in the non-heating region. Details of a disconnection pattern of the conductive layer 20*b* will be described below.

To be noted, while, in this example, the elastic layer 20*d* is disposed between the protective layer 20*c* and the release layer 20*e*, it is not limited to this. For example, it is acceptable to eliminate the elastic layer 20*d*, and arrange the protective layer 20*c* and the release layer 20*e* adjacent to each other. Further, it is acceptable to dispose a primer layer for a purpose of strengthening adhesiveness between respective layers. Further, on a more inner circumferential side than the base layer 20*a*, it is acceptable to dispose a layer that forms an inner surface of the fixing film 20.

Figure 4:
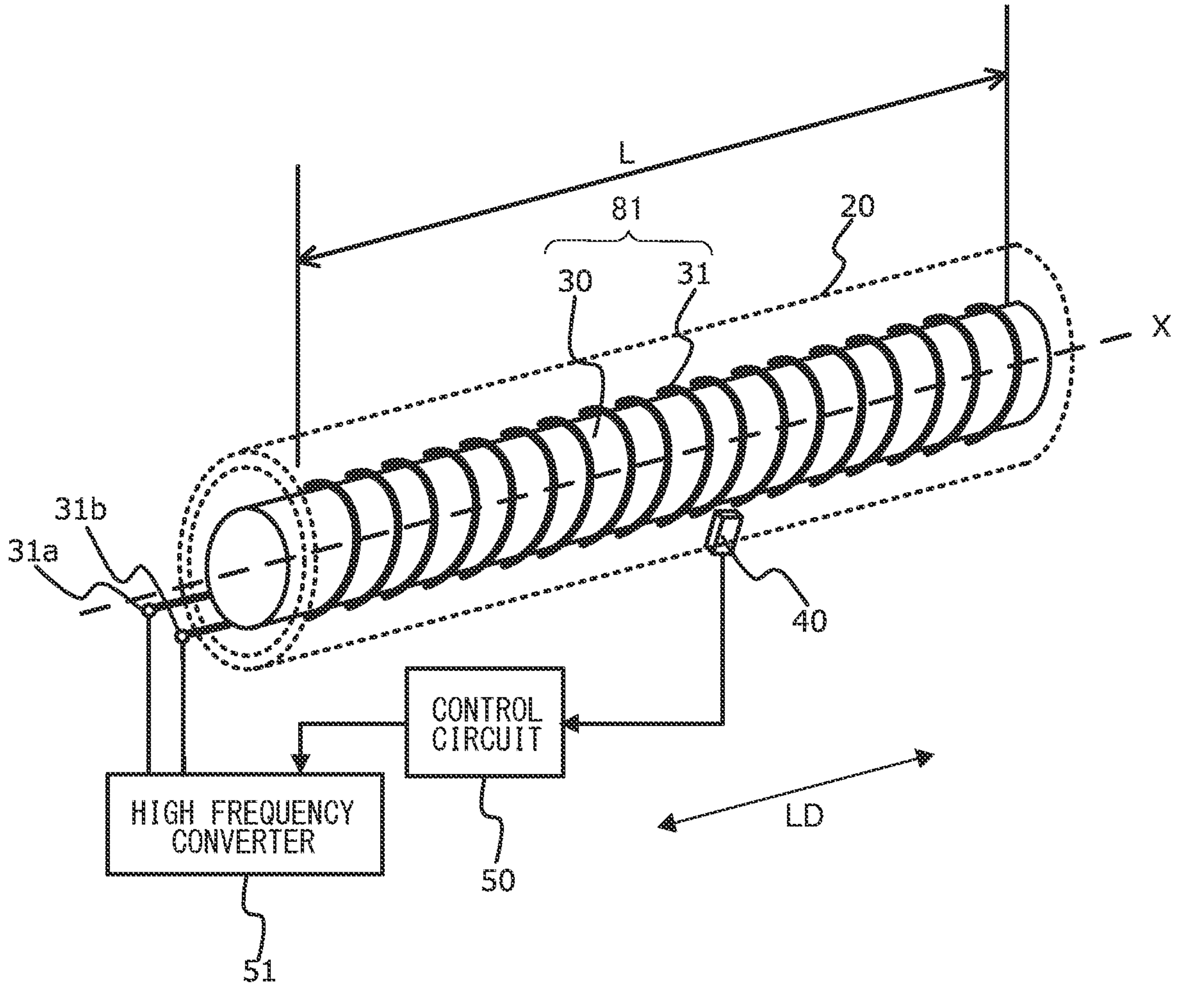
FIG. 4 is a perspective view illustrating the fixing film, a magnetic core, and an exciting coil.

Next, the magnetic core 30 and the exciting coil 31 disposed in the internal space of the fixing film 20 will be described. FIG. 4 is a perspective view illustrating the fixing film 20, the magnetic core 30, and the exciting coil 31. The magnetic core 30 has a cylindrical shape extending in the longitudinal direction LD, and is arranged substantially in a center within the fixing film 20 by a securing unit, not shown. This magnetic core 30 serves as a magnetic member that forms a path (magnetic circuit) of magnetic field lines (magnetic flux), which are created by the alternating magnetic field generated by the exciting coil 31, by inducing the magnetic field lines in the internal space of the fixing film 20.

It is desirable to form the magnetic core 30 from the material that has a low hysteresis loss and high relative permeability. As for the material of the magnetic core 30, it is preferable to use a ferromagnetic material composed of high magnetic permeability oxides or alloy materials, such as, for example, sintered ferrite, a ferrite resin, an amorphous alloy, and a permalloy. The magnetic core 30 is formed in a shape having ends with a length of 200 to 300 mm in the longitudinal direction LD, and it is desirable to increase a cross sectional area of the magnetic core 30 as large as possible within a range in which a diameter of the magnetic core 30 can fit in the internal space of the fixing film 20. In this example, sintered ferrite of 240 mm in length and 15 mm in diameter is used for the magnetic core 30. To be noted, a shape of the magnetic core is not limited to the cylindrical shape, and it is possible to choose such as a prismatic shape.

While, in this example, the magnetic core 30 is arranged only in the internal space of the fixing film 20 to form an open magnetic circuit, it is not limited to this. For example, it is acceptable to configure such that a magnetic core is arranged outside of the fixing film 20 in a manner surrounding the fixing film 20 so as to form a closed magnetic circuit.

The exciting coil 31 is formed by helically winding a single copper wire, which is 1 mm in diameter and coated with heat resistant polyamide imide, around the magnetic core 30 with a helical axis X as a center, and a helically shaped portion Lis formed. The helical axis X extends substantially parallel to the longitudinal direction LD. In the helically shaped portion L, spacing between coils (conductive wire) is uniform, and the number of windings is 18. When a high frequency current (alternating current) is passed through the exciting coil 31 via power supply contact portions 31*a* and 31*b*, the alternating magnetic field (magnetic field) is created in the longitudinal direction LD of the fixing film 20.

Heating Principle of Fixing Film

Figure 5A:
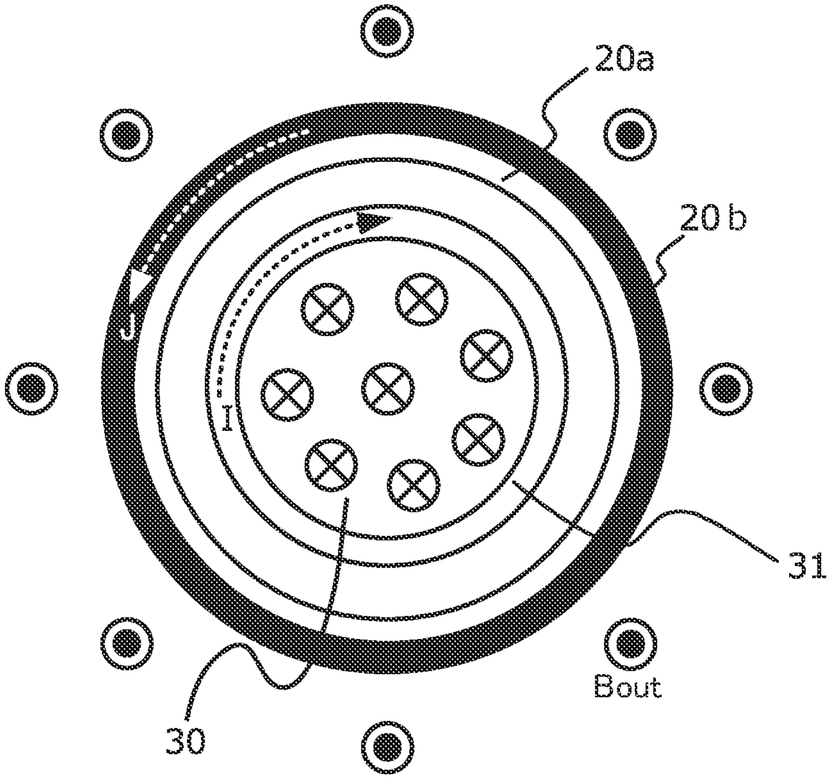
FIG. 5A is a cross-sectional view illustrating a cross section of the fixing film perpendicular to the longitudinal direction.
Figure 5B:
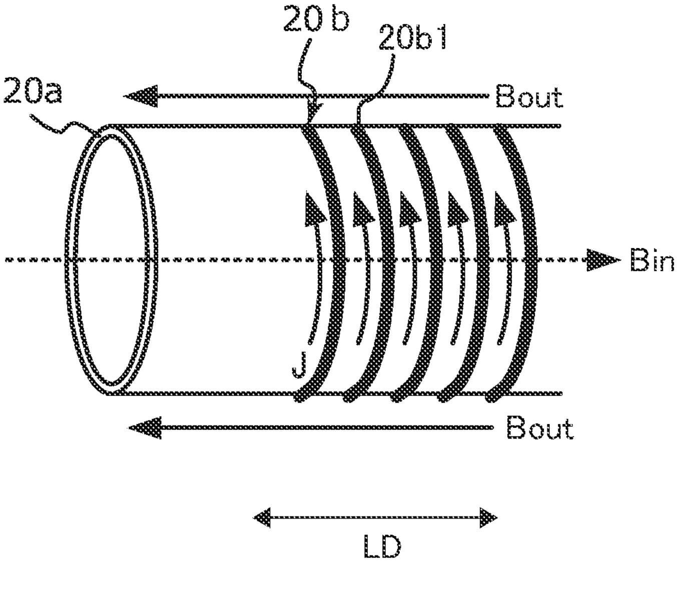
FIG. 5B is a perspective view for explaining a magnetic field and an electrical current flowing through the conductive layer.

With reference to FIGS. 5A and 5B, a heating principle of the fixing film 20 will be described. FIG. 5A is a cross-sectional view illustrating a cross section of the fixing film 20 perpendicular to the longitudinal direction LD for explaining the magnetic field and an electrical current flowing through the conductive layer 20*b*. FIG. 5B is a perspective view for explaining the magnetic field and the electrical current flowing through the conductive layer 20*b*. For simplicity, the protective, elastic, and release layers 20*c*, 20*d*, and 20*e* are not illustrated in FIGS. 5A and 5B.

In FIG. 5A, an example of arranging the magnetic core 30, the exciting coil 31, and the conductive layer 20*b* concentrically from a center of the fixing film 20 is illustrated. In FIG. 5A, Bin (indicated by a cross in a circle) signifies magnetic field lines in a direction toward the back of the diagram, and Bout (indicated by a filled dot in a circle) signifies magnetic field lines in a direction toward the front of the diagram.

As illustrated in FIG. 5A, at a moment when an electrical current is increasing in an arrow I direction through the exciting coil 31, the magnetic field lines Bin in the direction toward the back of the diagram are formed in the magnetic circuit, and the magnetic field lines Bout that return on an outer side of the fixing film 20 in the direction toward the front are formed. When the magnetic field lines described above are formed, an induced electromotive force is applied across the whole area of the conductive layer 20*b* in a circumferential direction so as to offset the magnetic field lines, and an electrical current (hereinafter, this electrical current is referred to as a circulating current) that circulates around the conductive layer 20*b* flows in an arrow J direction.

Since the induced electromotive force is applied in a circulating direction of the conductive layer 20*b*, the circulating current flows uniformly through the interior of the conductive layer 20*b*. Then, since the magnetic field lines generated by the magnetic core 30 repeatedly undergo generation, annihilation, and direction reversal due to the high frequency current flowing through the exciting coil 31, the circulating current flows while repeating generation, annihilation, and direction reversal synchronously with the high frequency current. When the electrical current flows through the conductive layer 20*b*, Joule heat is generated in the conductive layer 20*b* due to electrical resistance inherent to the material (metal) of the conductive layer 20*b*.

Since the magnetic field lines produced by the magnetic core 30 are generated in parallel to the longitudinal direction LD of the fixing film 20, the circulating current flows in a rotational direction of the fixing film 20. Therefore, as illustrated in FIG. 5B, the circulating current flows in the arrow J direction through each of the conductive layers 20*b* that are electrically disconnected each other in the fixing film 20. As described above, in the fixing film 20 of this example, by passing the high frequency current through the exciting coil 31, an induced current is generated in the disconnected conductive layer 20*b* (conductive element 20*b*1), and the conductive layer 20*b* (conductive element 20*b*1) generates the heat.

Fixing Operation

When an image forming operation of the printer 100 is started, the aforementioned fixing unit 80 electromagnetically induction heats the fixing film 20 at a predetermined timing based on the heat generation principle described above. Further, as illustrated in FIG. 2, the fixing unit 80 rotates the pressing roller 22 in an arrow Rp direction by a rotational drive of a motor, not shown. While the inner circumferential surface of the fixing film 20 is coming into contact with the plane 21*a* of the nip portion forming member 21, the fixing film 20 rotates in an arrow Rf direction by following the rotation of the pressing roller 22.

As illustrated in FIG. 4, a high frequency converter 51 supplies the high frequency current to the exciting coil 31 via the power supply contact portions 31*a* and 31*b*. A control circuit 50 controls the high frequency converter 51 based on a detected temperature of the temperature sensor 40 disposed in a central portion in the longitudinal direction LD of the fixing film 20. Thereby, while electromagnetically induction heating the fixing film 20, it is possible to maintain and adjust a surface temperature of the fixing film 20 at a predetermined target temperature (approximately 150° C. to 200° C.). Then, as illustrated in FIG. 2, when the recording material P that bears an unfixed toner image T (image) is nipped and conveyed in the nip portion Nf, the heat and pressure are applied to the toner image T, and the toner image T is fixed on the recording material P.

Disconnection Pattern of Conductive Layer

Figure 6B:
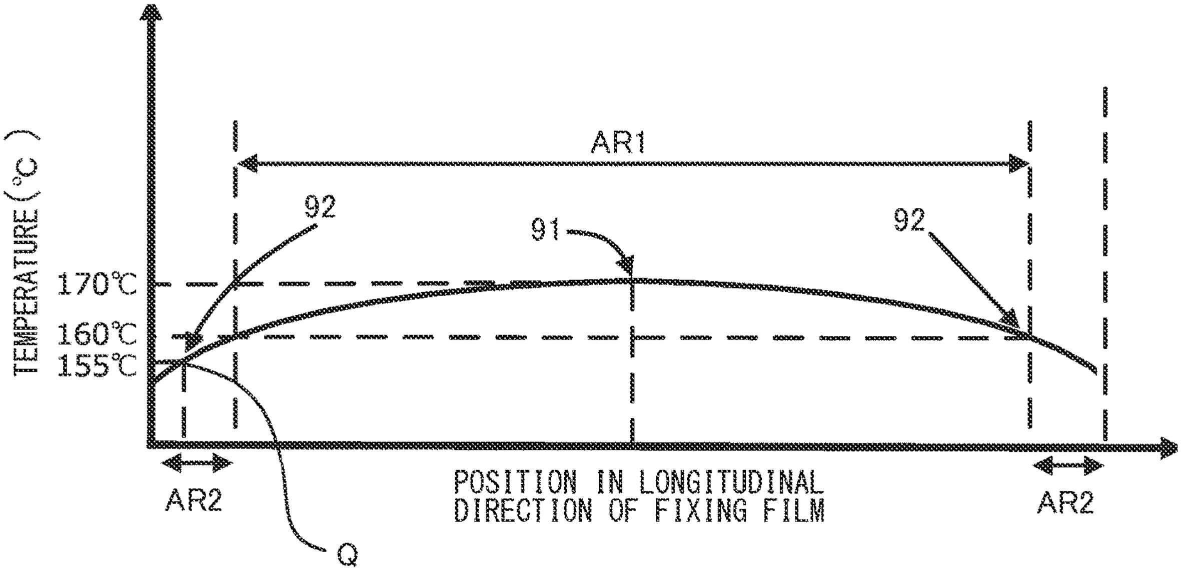
FIG. 6B is a diagram illustrating a temperature distribution across the whole area in the longitudinal direction of the fixing film in the example 1.
Figure 7A:
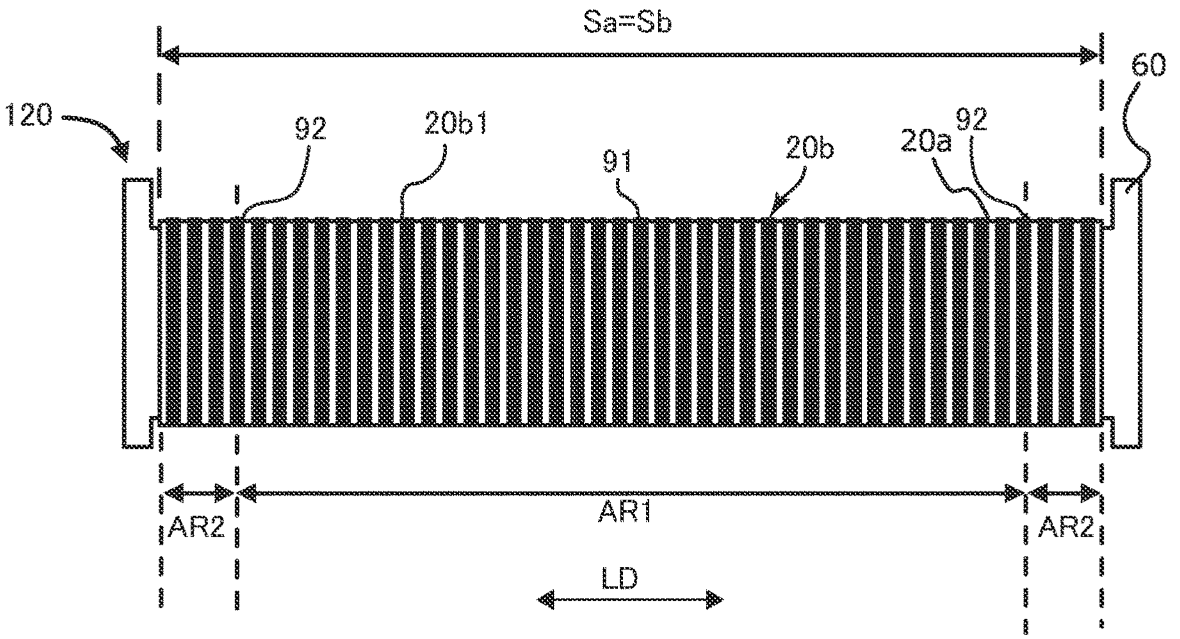
FIG. 7A is a diagram schematically illustrating a disconnection pattern of the conductive layer in a comparative example.
Figure 7B:
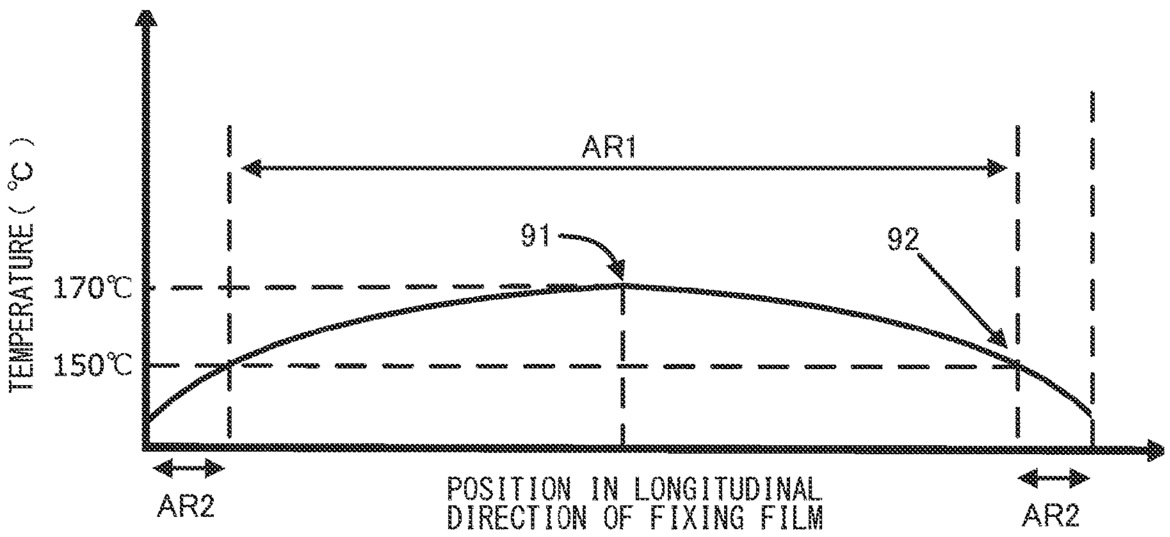
FIG. 7B is a diagram illustrating a temperature distribution across the whole area in the longitudinal direction of the fixing film in the comparative example.

Next, using FIGS. 6A to 7B, details of the disconnection pattern of the conductive layer 20*b* will be described. FIG. 6A is a diagram schematically illustrating the disconnection pattern of the conductive layer 20*b* in this example, and FIG. 6B is a diagram illustrating a temperature distribution across the whole area in the longitudinal direction LD of the conductive layer 20*b* in this example. FIG. 7A is a diagram schematically illustrating a disconnection pattern of the conductive layer 20*b* in a comparative example, and FIG. 7B is a diagram illustrating a temperature distribution across the whole area in the longitudinal direction LD of the conductive layer 20*b* in the comparative example. To be noted, for simplicity, the protective, elastic, and release layers 20*c*, 20*d*, and 20*e* of the fixing film 20 are not illustrated in FIGS. 6A and 7A.

As illustrated in FIG. 6A, the inner circumferential surface of the fixing film 20 is supported by the flange members 60 at both end portions in the longitudinal direction LD. The flange members 60 ensure the rotational stability of the fixing film 20, and, at the same time, play a role to regulate positions of the end portions in the longitudinal direction LD of the fixing film 20.

In this example, the width Sa of the fixing film 20 in the longitudinal direction LD is 240 mm. While, in this example, the width Sb in the longitudinal direction LD of the region in which the conductive layer 20*b* exists is set to the same as the width Sa, it is acceptable to set the width Sb smaller than the width Sa. Further, hereinafter, an area through which the recording material with a maximum width conveyable to the fixing film 20 passes is referred to as a first area AR1 (sheet passing area), and areas through which the recording material with the maximum width conveyable to the fixing film 20 does not pass is referred to as second areas AR2 (no-sheet passing area). That is, the second areas AR2 are areas outside of the first area AR1 in the longitudinal direction LD of the fixing film 20.

The first area AR1 includes a central area AR1*a* that includes a central portion 91 in the longitudinal direction LD of the first area AR1, and end portion areas AR1*b* that include end portions 92 in the longitudinal direction LD of the first area AR1. The end portion areas AR1*b* are adjacent to the central area AR1*a* in the longitudinal direction LD. While the end portion areas AR1*b* are disposed at both end portions in the longitudinal direction LD of the first area AR1, since the fixing film 20 is configured symmetrically in the longitudinal direction LD with the central portion 91 as a center, hereinafter, unless specifically stated, only one of the end portion areas AR1*b* will be described. Similarly, while the second areas AR2 are disposed at both the end portions in the longitudinal direction LD of the fixing film 20, hereinafter, unless specifically stated, only one of the second areas AR2 will be described. The width Sb is larger than the width of the first area AR1.

In this example, the width of each of a plurality of conductive elements 20*b*1 disposed in the end portion area AR1*b* and the second area AR2 in the longitudinal direction LD is wider than the width of each of a plurality of conductive elements 20*b*1 disposed in the central area AR1*a* in the longitudinal direction LD. This is to reduce a difference in a heat generation amount with the central portion 91. By reducing the resistance (hereinafter referred to as circumferential resistance R) of the conductor elements 20*b*1 disposed in the end portion area AR1*b* and the second area AR2, a heat generation amount in the end portion 92 is increased.

The circumferential resistance R can be calculated by an equation 1 below:

$$R = (\rho \times \text{circumferential length of conductive element}) / (\text{width of conductive element} \times \text{layer thickness of conductive element}) \quad (1)$$

To be noted, ρ is a volumetric electrical resistivity of the conductive element 20*b*1.

In this example, the width of an area Sc combining the end portion area AR1*b* and the second area AR2 in the longitudinal direction LD is 20 mm. In this example, in the area Sc, the plurality of conductive elements 20*b*1 each with a width of 300 μm are arranged at intervals of 200 μm. Further, in the central area AR1*a*, the plurality of conductive elements 20*b*1 each with a width of 200 μm are arranged at intervals of 200 μm. The width of the conductive element 20*b*1 disposed in the area Sc is larger than the width of the conductive element 20*b*1 disposed in the central area AR1*a*. Therefore, the circumferential resistance of the conductive element 20*b*1 disposed in the area Sc is lower than the circumferential resistance of the conductive element 20*b*1 disposed in the central area AR1*a*.

That is, when a resistance value of each of the conductive elements 20*b*1 disposed in the central area is referred to as a first resistance value, a resistance value of each of the conductive elements 20*b*1 disposed in the area Sc including the end portion area AR1*b* is a second resistance value that is lower than the first resistance value. Further, a resistance value of each of the conductive elements 20*b*1 disposed in the second area AR2 is a third resistance value that is lower than the first resistance value. While, in this example, the third resistance value is set to the same as the second resistance value, it is not limited to this, and it is acceptable to set the third resistance value to a value that is lower than the second resistance value. The resistance value of each conductive element **20*b*1** disposed in the area Sc including the end portion area AR1*b* does not need to be exactly the first resistance value, and it is sufficient if the resistance values of the conductive elements **20*b*1 disposed in the area Sc are approximately similar to each other. Similarly, the resistance value of each conductive element 20*b*1** disposed in the area Sc including the end portion area AR1*b* does not need to be exactly the second resistance value, and it is sufficient if the resistance values are approximately similar to each other.

To be noted, while, in FIGS. 6A, 7A, 8, 9, 10A, 11, and 12, the width of each conductive element is schematically illustrated, the number and a shape of each conductive element are not limited to these. For example, while, in FIG. 6A, it is illustrated that only one conductive element **20*b*1** is disposed in the end portion area AR1*b*, actually, it is acceptable to dispose a plurality of conductive elements **20*b*1. Also in the other examples, it is acceptable to dispose a plurality of conductive elements 20*b*1** in each of such as the central, end portion, first, and second areas.

Here, as other means to lower the resistance of the conductive element **20*b*1 in the area Sc, the following can be considered. For example, it is acceptable to make a layer thickness of the conductive element 20*b*1 in the area Sc thicker than the thickness of the conductive element 20*b*1** in the central area AR1*a*. That is, in a thickness direction of the conductive layer **20*b* intersecting with the longitudinal direction LD, the thickness of each of the plurality of conductive elements 20*b*1** disposed in the end portion area AR1*b* may be made thicker than the thickness of each of the plurality of conductive elements **20*b*1** disposed in the central area AR1*a*. Further, it is acceptable to select the material of each conductive element **20*b*1 such that the volumetric electrical resistivity of the conductive element 20*b*1 in the area Sc becomes smaller than the volumetric electrical resistivity of the conductive element 20*b*1** in the central area AR1*a*. That is, the volumetric electrical resistivity of the conductive element **20*b*1 disposed in the area Sc may be made smaller than the volumetric electrical resistivity of the conductive element 20*b*1** disposed in the central area AR1*a*.

To be noted, an optimum value of the width of the area Sc differs depending on such as the length of magnetic core 30, the volumetric electrical resistivity of the conductive element **20*b*1, a frequency of the electrical current flowing through the exciting coil 31. In each configuration, it is preferable to select an optimum range to ensure that a heating distribution in the longitudinal direction of the fixing film 20** is as uniform as possible.

For example, when the length of the magnetic core 30 increases, the magnetic flux density penetrating in the longitudinal direction LD in the end portion of the fixing film 20 increases. That is, since a reduction in the heat generation amount in the end portion of the fixing film 20 decreases, it is preferable to narrow the area Sc in which the resistance value of the conductive element **20*b*1** is lowered.

Further, when the material of the conductive element **20*b*1 disposed in the area Sc is changed to a material with a low volumetric electrical resistivity, since the heating distribution in the longitudinal direction LD of the fixing film 20 approaches in a uniform direction, it is preferable to narrow the area Sc in which the resistance value of the conductive element 20*b*1** is lowered.

Further, when the frequency flowing through the exciting coil 31 increases, since the heating distribution in the longitudinal direction LD of the fixing film 20 approaches in the uniform direction, it is preferable to narrow the area Sc in which the resistance value of the conductive element **20*b*1** is lowered.

Incidentally, since, in this example, the magnetic core 30 with the shape having ends is used, the magnetic flux density in the end portion in the longitudinal direction LD of the fixing film 20 decreases compared to the central portion. Then, the induced electromotive force in the end portion decreases. For example, as illustrated in FIG. 7A, the disconnection pattern of the conductive layer **20*b* of a fixing film 120 pertaining to the comparative example is considered. In the comparative example, the conductive layer 20*b* is formed from a plurality of conductive elements 20*b*1 each with a uniform width. That is, in the comparative example, in both the first and second areas AR1 and AR2, the conductive elements 20*b*1 each with the same width are used, and the circumferential resistance R is uniform. For example, in the comparative example, similar to the central area AR1 of the example 1, a plurality of the conductive elements 20*b*1** each with a width of 200 μm are arranged at intervals of 200 μm.

A maximum width of the recording material conveyable to the fixing films 20 and 120 of this example and the comparative example is 215.9 mm that corresponds to the letter (LTR) size. In a case where the recording material of the LTR size is conveyed to the fixing film 120 of the comparative example, since the magnetic flux density in the end portion of the first area AR1 decreases, the heat generation amount in the end portion 92 decreases compared to the central portion 91. Therefore, in the toner fixability that has a positive correlation with the heat generation amount, when the heat is generated to satisfy the toner fixability in the end portion 92 of the LTR size, since the heat generation amount in the central portion 91 is higher than the heat generation amount in the end portion 92, the heat generation amount in the central portion 91 becomes an excessive heat generation amount that is equal to or more than what is required to satisfy the fixability. Thus, since unnecessary energy is consumed in the central portion 91, it is undesirable from a perspective of energy efficiency.

On the other hand, in this example, in the area Sc including the end portion area AR1*b*, the resistance value of the conductive element **20*b*1 is lowered in comparison with the resistance value of the conductive element 20*b*1** disposed in the central area AR1*a*. Therefore, in the fixing film 20 of this example illustrated in FIG. 6A, the heat generation amount in the end portion 92 increases in comparison with the fixing film 120 of the comparative example illustrated in FIG. 7A. In other words, in this example, it is possible to suppress a decrease in the heat generation amount in the end portion 92 of the first area AR1 through which the recording material with the maximum width conveyable to the fixing film 20 passes. Therefore, the difference in the heat generation amount between the central portion 91 and the end portion 92 decreases, and the heat generation amount across the whole area of the fixing film 20 in the longitudinal direction approaches in the uniform direction, so that it becomes possible to improve the energy efficiency.

Operational Effect of Example 1

Next, an evaluation experiment conducted to confirm a uniformization effect of this example on the heating distribution in the longitudinal direction of the fixing film 20 will be described. So as to confirm the effect, the fixing film 20 of this example illustrated in FIG. 6A and the fixing film 120 of the comparative example illustrated in FIG. 7A were compared. In the evaluation experiment of this example, the effect was confirmed by comparing surface temperatures, which have a positive correlation with the heat generation amount, of the fixing films 20 and 120.

As measurement conditions, temperature distributions along the longitudinal direction LD of the fixing films 20 and 120 were measured using an infrared thermos-viewer (R300SR manufactured by Nippon Avionics Co., Ltd.) at the time when the fixing films 20 and 120 were Joule-heated by flowing the high frequency current through the exciting coil 31.

So as to generate the heat in the fixing films 20 and 120, the high frequency converter 51 illustrated in FIG. 4 was controlled to allow the alternating current to flow through the exciting coil 31 at a frequency of 80 kilohertz (kHz). Further, by the control circuit 50, the high frequency converter 51 was controlled to maintain a detected result of the temperature sensor 40, namely, surface temperatures of the central portions 91 of the fixing films 20 and 120 at 170° C.

This example and the comparative example were compared by measuring the surface temperatures (temperature distributions) of the whole areas of the fixing films 20 and 120 in the longitudinal direction LD at a step where the surface temperatures of the fixing film 20 and 120 were maintained at 170° C. The results of this example are illustrated in FIG. 6B, and the results of the comparative example are illustrated in FIG. 7B. Further, Table 1 indicates the measurement results of the surface temperatures of the fixing film 20 and 120 in the end portions 92 and the central portions 91, and a calculation result of a difference in the surface temperature between the end portion 92 and the central portion 91. To be noted, the surface temperatures of the fixing films 20 and 120 in the end portions 92 were measured at positions 15 mm inward from edges of the fixing film 20 and 120 in the longitudinal direction LD.

TABLE 1

| | Comparative Example | Example 1 |
|---|---|---|
| Surface Temperature in Central Portion | 170° C. | 170° C. |
| Surface Temperature in End Portion | 150° C. | 160° C. |
| Temperature Difference between Central and End Portions | Δ20° C. | Δ10° C. |

As described above, in the case where the magnetic core 30 with the shape having ends was used, the magnetic flux density in the end portions of the fixing films 20 and 120 in the longitudinal direction LD decreased. In the comparative example illustrated in FIG. 7A, the conductive layer 20*b* is formed by the plurality of conductive elements 20*b*1 each with the uniform width. Therefore, while the surface temperature of the central portion 91 (of the central area AR1*a*) was 170° C., the surface temperature of the end portion 92 (of the end portion area AR1*b*) was 150° C. Therefore, the difference in the surface temperature between the central and end portions 91 and 92 becomes 20° C.

On the other hand, in this example illustrated in FIG. 6A, by changing the width of the conductive element 20*b*1, the resistance value of the conductive element 20*b*1 disposed in the area Sc including the end portion area AR1*b* is lowered in comparison with the resistance value of the conductive element 20*b*1 disposed in the central area AR1*a*. Therefore, it is possible to suppress the decrease in the heat generation amount in the end portion 92 (end portion area AR1*b*).

As a result, while the surface temperature of the central portion 91 (of the central area AR1*a*) was 170° C., the surface temperature of the end portion 92 (of the end portion area AR1*b*) was 160° C. That is, the difference in the surface temperatures between the central and end portions 91 and 92 becomes 10° C. Further, it is found that, in comparison with the temperature distribution of the comparative example illustrated in the FIG. 7B, the temperature distribution of this example illustrated in the FIG. 6B approaches uniformity across the whole area in the longitudinal direction.

As described above, in this example, by lowering the resistance value of the conductive element 20*b*1 disposed in the area Sc in comparison with the resistance value of the conductive element 20*b*1 disposed in the central area AR1*a*, it is possible to suppress the decreases in the heat generation amounts of the plurality of conductive elements in the end portion area AR1*b*. Thereby, it is possible to improve the energy efficiency while improving the fixability in the end portion area AR1*b* by ensuring the heating distribution in the longitudinal direction of the first area AR1, through which the recording material P passes, to approach in the uniform direction.

Further, since the winding intervals of the exciting coil 31 are constant in the longitudinal direction LD, in comparison with a case, for example, where the winding intervals of the exciting coil 31 are narrowed in the end portion area AR1*b*, or where the exciting coil 31 is wound in overlapping layers, the energy efficiency can be improved, and the enlargement of the apparatus can be suppressed.

Further, since the fixing unit 80 of the electromagnetic induction heating system is used, a rate of temperature rise is fast for the fixing film 20. Therefore, a superior quick-start capability is offered, and it is possible to reduce a waiting time for printing.

Example 2

Figure 8:
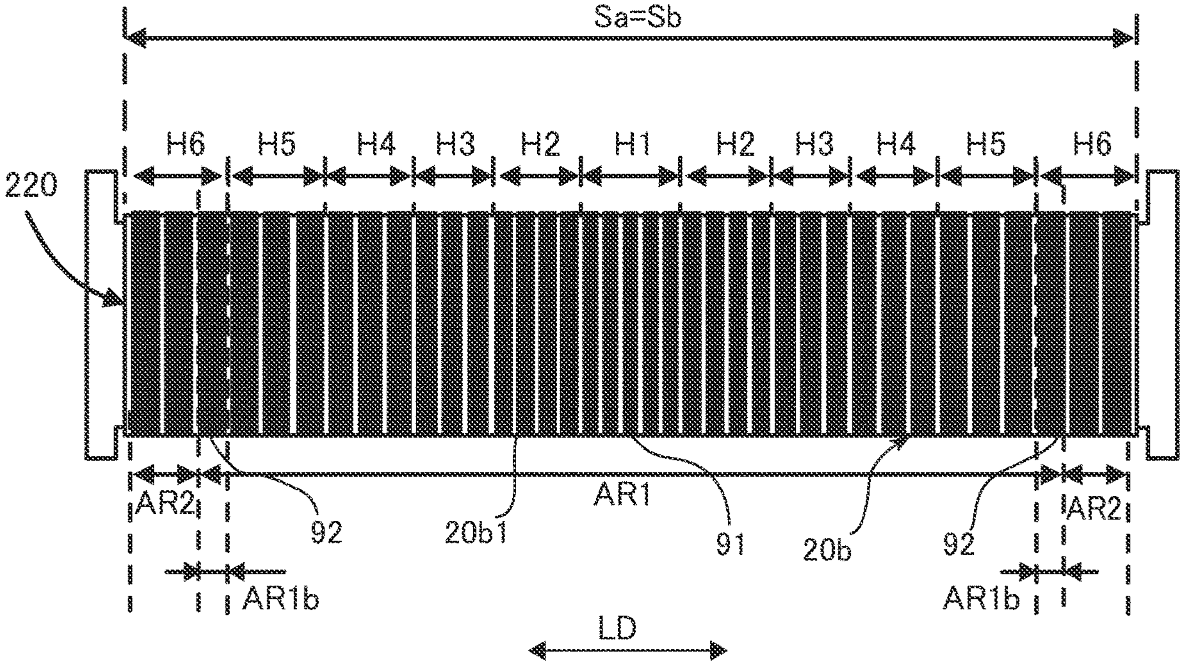
FIG. 8 is a diagram schematically illustrating a disconnection pattern of the conductive layer in an example 2.
Figure 9:
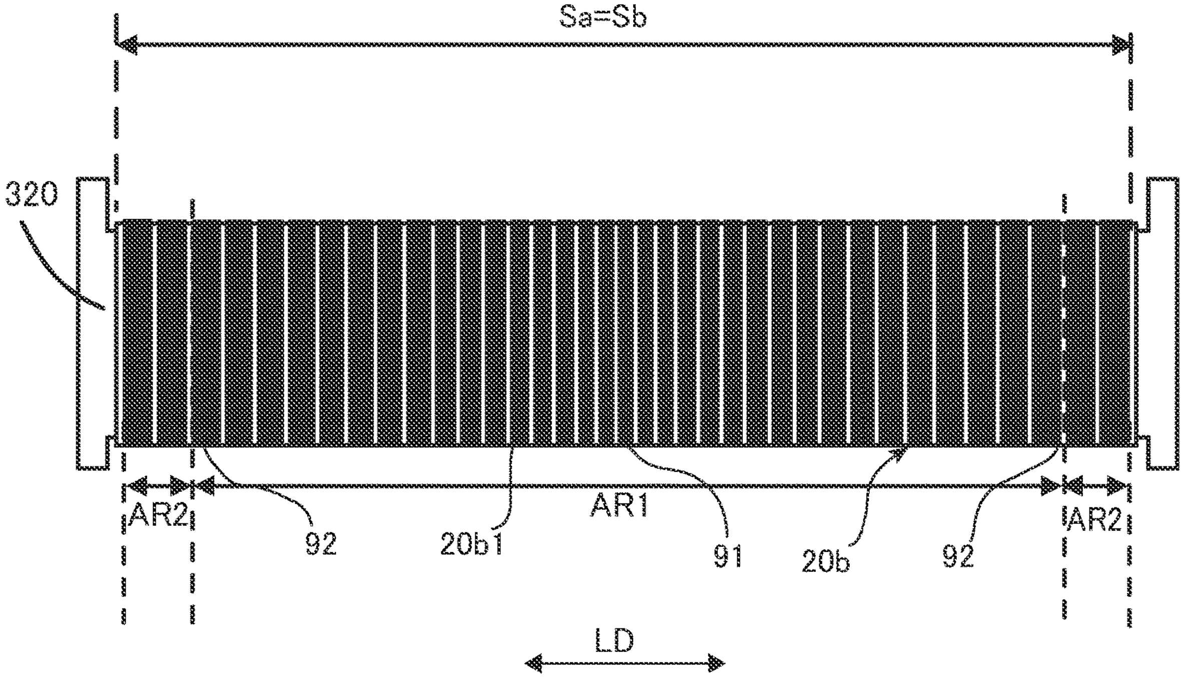
FIG. 9 is a diagram schematically illustrating a disconnection pattern of the conductive layer in a variant example of the example 2.

While, next, an example 2 of this disclosure will be described, the disconnection pattern of the conductive layer 20*b* of the example 1 is changed in the example 2. Therefore, configurations similar to the example 1 will be described by omitting illustrations or by putting the same reference characters on drawings herein. FIG. 8 is a diagram schematically illustrating a disconnection pattern of the conductive layer 20*b* in the example 2.

In the example 1 described above, the resistance value of the conductive element 20*b*1 disposed in the area Sc including the end portion area AR1*b* is set to a lower value in comparison with the resistance value of the conductive element 20*b*1 disposed in the central portion area AR1*a*. However, when a difference in the resistance value at a boundary between the area Sc and the central area AR1*a* is large, there is a possibility that a large difference in the heat generation amount, that is, uneven heat generation may occur at the boundary. When such uneven heat generation occurs, there is a possibility that, since, at the time of fixing the toner on the recording material, unevenness of the density of the image may be generated at and around the boundary described above, the quality of the image may be degraded.

Therefore, in the example 2, as illustrated in FIG. 8, a plurality of areas H2 to H5 are disposed between a central area H1 and an area H6 including an end portion area AR1*b*, and the width of the conductive element 20*b*1 in each area is progressively widened from the central area H1 toward the area H6. Thereby, from the central area H1 toward the area H6, the resistance value of the conductive element 20*b*1 in each area is progressively lowered, and it is possible to reduce the uneven heat generation.

In this example, in the longitudinal direction LD, an area through which the recording material with a maximum width conveyable to the fixing film 220 passes is referred to as the first area AR1*a* (sheet passing area), and an area through which the recording material with the maximum width conveyable to the fixing film 220 does not pass is referred to as the second area AR2 (no-sheet passing area). The first area AR1 includes the central area H1 incorporating the center portion 91 of the first area AR1 in the longitudinal direction LD, the end portion area AR1*b* incorporating the end portion 92 of the first area AR1 in the longitudinal direction, and the plurality of areas H2 to H5. While the plurality of areas H2 to H5 are symmetrically disposed on both sides in the longitudinal direction LD with the central portion 91 as a center, hereinafter, unless specifically stated, only one of the plurality of areas H2 to H5 will be described. The end portion area AR1*b* and the second area AR2 constitute the area H6. The central area H1 to the area H6 are, in this order, disposed from the central side to the end portion side of the fixing film 220.

In the central area H1 to the area H6, each of the plurality of conductive elements 20*b*1 belonging to the same area has the same width and the same resistance value. As described above, in the longitudinal direction LD, the resistance value of the conductive element 20*b*1 in each area is progressively lowered from the central area H1 toward the area H6. In other words, in the longitudinal direction LD, in the plurality of areas (H1 to H6), the resistance value of each of the plurality of conductive elements 20*b*1 progressively decreases from an area (central area H1) that is on the central side toward an area (area H6) that is on the end portion side. That is, when the resistance value of each of the conductive elements 20*b*1 disposed in the central area H1 is referred to as a first resistance value, the resistance value of each of the conductive elements 20*b*1 disposed in the area H6 is a second resistance value that is lower than the first resistance value. Then, each of the plurality of conductive elements 20*b*1 belonging to the areas H2 to H5 has a resistance value that is smaller than the first resistance value and larger than the second resistance value.

In this example, the width of central area H1 in the longitudinal direction LD is approximately 40 mm, and the width of each of the areas H2 to H6 in the longitudinal direction LD is approximately 20 mm. Widths of the conductive elements 20*b*1 of the central area H1 and the areas H2 to H6 each are respectively 200 μm, 220 μm, 240 μm, 260 μm, 280 μm, and 300 μm. Further, across the central area H1 to the area H6, the plurality of conductive elements 20*b*1 are arranged at intervals of 200 μm.

As described above, by diving the conductive layer 20*b* of the fixing film 220 into the plurality of areas (H1 to H6) and by progressively lowering the resistance value of the conductive element 20*b*1 from the central portion toward the end portion in the longitudinal direction, it is possible to reduce the uneven heat generation. Therefore, it is possible to improve the quality of the image on the recording material. Further, while improving the fixability in the end portion AR1*b* by ensuring the heating distribution in the longitudinal direction LD of the first area AR1, through which the recording material P passes, to approach in the uniform direction, it is possible to improve the energy efficiency.

Variant Example of Example 2

To be noted, while, in the example 2, the conductive layer 20*b* is divided into the plurality of areas (H1 to H6) and the resistance value of the conductive element 20*b*1 is set for each area, it is not limited to this. For example, similar to a variant example of the example 2 illustrated in FIG. 9, it is acceptable to configure such that the resistance value is progressively lowered for each of the conductive elements 20*b*1 from the center portion 91 toward an end portion of a fixing film 320 in the longitudinal direction.

In particular, the width of each of the plurality of the conductive elements 20*b*1 in the longitudinal direction LD disposed in the first area AR1 is progressively increased from the central portion 91 toward the end portion 92. Therefore, the resistance value of each of the plurality of conductive elements 20*b*1 disposed in the first area AR1 is, in the longitudinal direction LD, set to decrease from the central portion 91 toward the end portion 92. Therefore, it is possible to further reduce the uneven heat generation.

To be noted, as another method to decrease the resistance of the conductive element 20*b*1, it is acceptable to increase the layer thickness of the conductive element 20*b*1 or select a conductive element 20*b*1 made from a material with a smaller volumetric electrical resistivity.

Example 3

While, next, an example 3 of this disclosure will be described, the example 3 is an example in which the disconnecting pattern of the conductive layer 20*b* of the example 1 is changed. Therefore, configurations similar to the example 1 will be described by omitting illustrations or by putting the same reference characters on drawings herein.

Generally, when the recording material (paper sheet) passes through the fixing unit, since the heat is not taken by the recording material in the no-sheet passing area in which the fixing film does not come into contact with the recording material, a so-called temperature rise in the no-sheet passing area occurs, and a temperature of the fixing film locally rises.

If the temperature of the fixing film rises excessively, there is a possibility that durability may decrease due to such as the accelerated wear of outer and inner surfaces of the fixing film or changes in physical properties. Further, since a heat generation amount in the no-sheet passing area is consumed for increasing a temperature of an area unnecessary for fixing the toner on the recording material, it is preferable to suppress the temperature rise in the no-sheet passing area from the perspective of the energy efficiency.

Figure 10A:
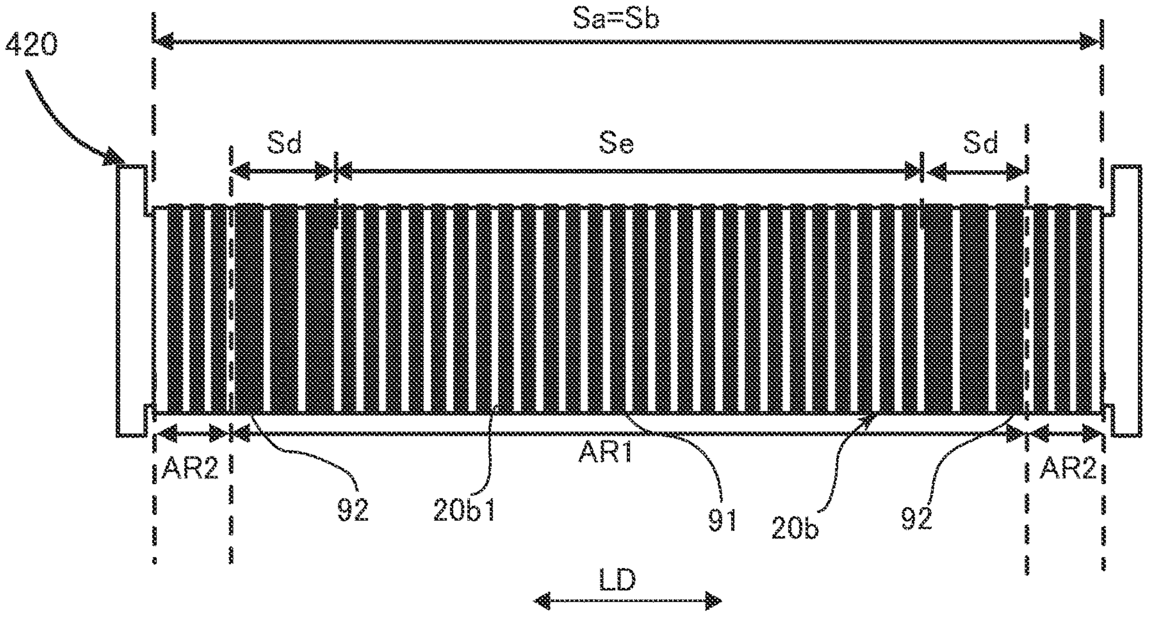
FIG. 10A is a diagram schematically illustrating a disconnection pattern of the conductive layer in an example 3.
Figure 10B:
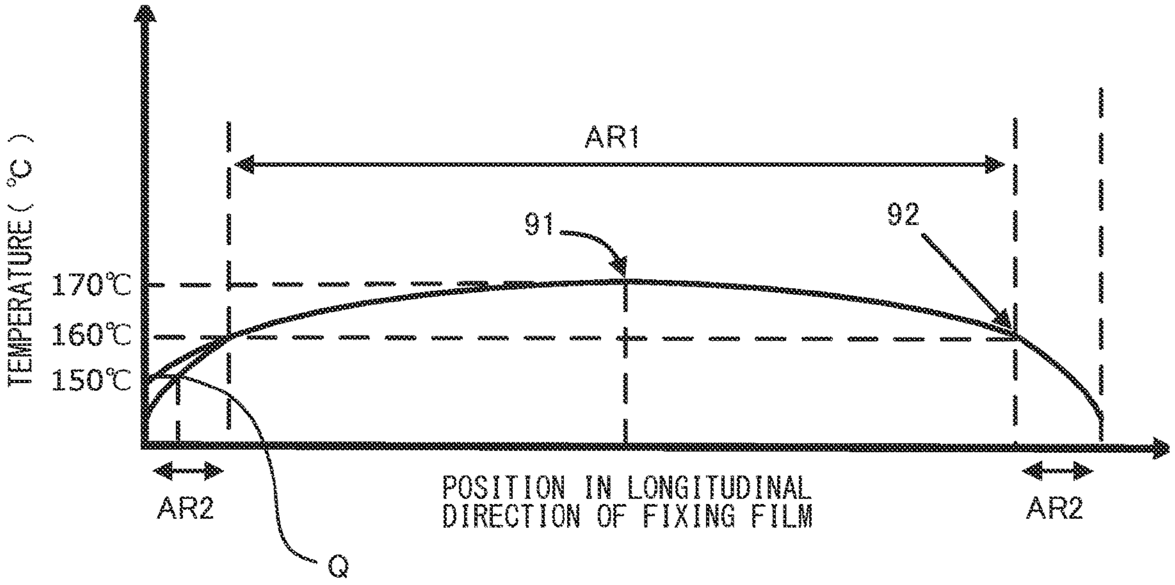
FIG. 10B is a diagram illustrating a temperature distribution across the whole area in the longitudinal direction of the fixing film in the example 3.

Therefore, in the example 3, an arrangement pattern of the conductive layer 20*b* is set so as to suppress a temperature rise in the second area AR2 that is the no-sheet passing area. FIG. 10A is a diagram schematically illustrating a disconnecting pattern of the conductive layer 20*b* in the example 3, and FIG. 10B is a diagram illustrating a temperature distribution in the whole area of the fixing film 420 in the longitudinal direction LD in the example 3.

In this example, in the longitudinal direction LD, an area through which the recording material with a maximum width conveyable to the fixing film 420 passes is referred to as the first area AR1 (sheet passing area), and an area through which the recording material with the maximum width conveyable to the fixing film 420 does not pass is referred to as the second area AR2 (no-sheet passing area). The first area AR1 includes a central area Se incorporating the central portion 91 of the first area AR1 in the longitudinal direction, and end portion areas Sd incorporating the end portions 92 of the first area AR1 in the longitudinal direction. The end portion areas Sd are adjacent to the central area Se in the longitudinal direction LD. While the end portion areas Sd are disposed on both sides of the first area R1 in the longitudinal direction LD, since the fixing film 420 is symmetrically configured in the longitudinal direction LD with the central portion 91 as a center, hereinafter, unless specifically stated, only one of the end portion areas Sd will be described. Similarly, while the second areas AR2 are disposed in both end portions of the fixing film 420 in the longitudinal direction LD, hereinafter, unless specifically stated, only one of the second areas AR2 will be described.

In this example, the width of the end portion area Sd in the longitudinal direction LD is 20 mm. In this example, a plurality of conductive elements **20*b*1 each with a width of 300 μm are disposed at intervals of 200 μm in the end portion area Sd. Further, a plurality of conductive elements 20*b*1 each with a width of 200 μm are disposed at intervals of 200 μm in the central area Se and the second area AR2. The width of the conductive element 20*b*1 disposed in the end portion area Sd is larger than the width of the conductive element 20*b*1 disposed in the central area Se and the second area AR2. Therefore, a circumferential resistance of the conductive element 20*b*1 disposed in the end portion area Sd is lower than a circumferential resistance of the conductive element 20*b*1 disposed in the central area Se and the second area AR2**.

That is, when a resistance value of each of the conductive elements **20*b*1 disposed in the central area Se is referred to as a first resistance value, a resistance value of each of the conductive elements 20*b*1 disposed in the end portion area Sd is a second resistance value that is lower than the first resistance value. Further, a resistance value of each of the conductive elements 20*b*1 disposed in the second area AR2** is a fourth resistance value that is higher than the second resistance value. In this example, while the fourth resistance value is set to the same as the first resistance value, it is not limited to this, and it is acceptable to set the fourth resistance value to a value that is lower than the first resistance value, or to a value that is lower than the first resistance value and equal to or higher than the second resistance value.

To be noted, an optimum width of the end portion area Sd differs depending on the length of the magnetic core 30, the volumetric electrical resistivity of the conductive element **20*b*1, and the frequency of the current flowing through the exciting coil 31. In each configuration, it is preferable to choose an optimum range that allows the heating distribution in the longitudinal direction of the fixing film 420** to be as uniform as possible.

Here, in the disconnection pattern of the conductive element **20*b*1 of the fixing film 20 pertinent to the example 1 described in FIG. 6A, similar to the end portion area AR1*b* (refer to FIG. 6A), the resistance value of the second area AR2 that is the no-sheet passing area is also set low. Therefore, the heat generation amount of the second area AR2 increases. Since a temperature rise in the second area AR2 is not necessary, from the perspective of the energy efficiency, it is preferable to suppress the temperature rise in the second area AR2**.

On the other hand, in this example, without lowering the resistance value of the conductive element **20*b*1 disposed in the second area AR2, only the resistance value of the conductive element 20*b*1 disposed in the end portion area Sd is set low. To be noted, the resistance value of the conductive element 20*b*1 disposed in the second area AR2 is the same as the resistance value of the conductive element 20*b*1** disposed in the central area Se.

Operational Effect of Example 1

Next, an evaluation experiment conducted to confirm a uniformization effect of the heating distribution in the longitudinal direction of the fixing film 420 of this example, and the suppression of the temperature rise in the no-sheet passing area will be described. So as to confirm the effect, the fixing film 20 of the example 1 illustrated in FIG. 6A and the fixing film 420 of the example 3 illustrated in FIG. 10A were compared. Since comparison methods and measurement conditions used for the confirmation of the effect were the same as the evaluation experiment of the example 1, descriptions are omitted herein.

Surface temperatures (temperature distributions) of the whole areas of the fixing films 20 and 420 in the longitudinal direction LD were measured at a step where the surface temperatures of the fixing film 20 and 420 were maintained at 170° C., and the examples 1 and 3 were compared. Results of the example 3 are illustrated in FIG. 10B. Table 2 indicates measurement results of the surface temperatures of the fixing film 20 and 420 in the end portions 92 and the central portions 91. Further, Table 2 indicates calculation results of differences in the surface temperature between the end portion 92 and the central portion 91, and measurement results of the surface temperatures at points Q within the second areas AR2 of the fixing films 20 and 420. To be noted, the surface temperatures of the fixing films 20 and 420 in the end portions 92 were measured at positions 15 mm inward from edges of the fixing films 20 and 420 in the longitudinal direction LD. The surface temperatures of the fixing films 20 and 420 at the points Q within the second areas AR2 were measured at positions 10 mm inward from the edges of the fixing films 20 and 420 in the longitudinal direction LD.

TABLE 2

| | This Example | Example 1 |
|---|---|---|
| Surface Temperature in Central Portion | 170° C. | 170° C. |
| Surface Temperature in End Portion | 160° C. | 160° C. |
| Temperature Difference between Central and End Portions | Δ10° C. | Δ10° C. |
| Surface Temperature in Second Area | 150° C. | 155° C. |

It is found that, in the temperature distribution of the example 1 illustrated in FIG. 6B, by lowering the resistance value of the conductive element **20*b*1 disposed in the area Sc, the heat generation amount increases in the end portion area including the second area AR2 that is the no-sheet passing area. As a result, the surface temperature of the fixing film 20 at the point Q within the second area AR2** was 155° C.

On the other hand, in the example 3, since the resistance value of the second area AR2 is not set low, the heat generation amount in the second rea AR2 is small in comparison with the example 1. As a result, the surface temperatures in the central and end portions 91 and 92 were respectively 170° C. and 160° C., and the surface temperature of the fixing film 420 at the point Q within the second area AR2 was 150° C. That is, the surface temperature difference between the central and end portions 91 and 92 is 10° C. In the examples 3 and 1, there is not a difference in the surface temperature difference between the central and end portions 91 and 92 within the first area AR1 that is the sheet passing area.

Further, when the temperature distribution within the first area AR1 of the example 1 illustrated in FIG. 6B and the temperature distribution within the first area AR1 of the example 3 illustrated in FIG. 10B are compared, it is found that, similarly to the example 1, the temperature distribution of example 3 is uniformized. On the other hand, in the temperature distribution within the second area AR2, from the end portion 92 of the first areas AR1 to the edge of the fixing film 420, the temperature distribution of the example 3 is lower than the temperature distribution of the example 1. That is, it is found that the example 3 is lower than the example 1 in the temperature of the no-sheet passing area.

As described above, in this example, only the resistance value of the conductive element **20*b*1 disposed in the end portion area Sd incorporating the end portion 92 is set lower in comparison with the resistance value of the conductive element 20*b*1 disposed in the central area Se. Therefore, it is possible to improve the energy efficiency, while improving fixability in the end portion area Sd by ensuring the heating distribution in the longitudinal direction LD of the first area AR1, through which the recording material P passes, to approach in the uniform direction. Further, it is possible to suppress the temperature rise of the fixing film 420 in the second area AR2** that is the no-sheet passing area.

Variant Example 1 of Example 3

To be noted, while, in the example 3, the conductive element **20*b*1 is also disposed in the second area AR2, it is not limited to this. For example, similar to a fixing film 520 pertinent to a variant example 1 of the example 3 illustrated in FIG. 11, the conductive element 20*b*1 may not be disposed in the second area AR2. Therefore, it is possible to further suppress the temperature rise in the second area AR2 of the fixing film 520**.

Variant Example 2 of Example 3

Figure 12:
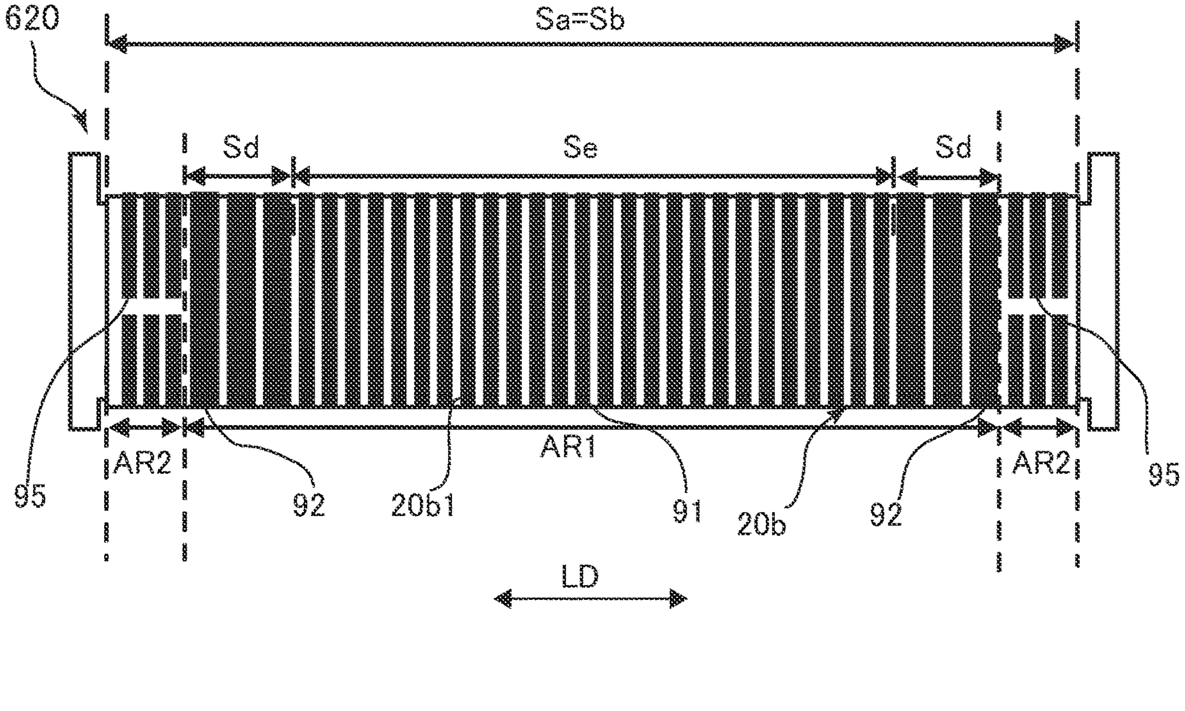
FIG. 12 is a diagram schematically illustrating a disconnection pattern of the conductive layer in a variant example 2 of the example 3.

Further, for example, similar to a fixing film 620 pertinent to a variant example 2 of the example 3 illustrated in FIG. 12, it is acceptable to dispose a notch on each of the conductive elements **20*b*1 disposed in the second area AR2**.

Figure 11:
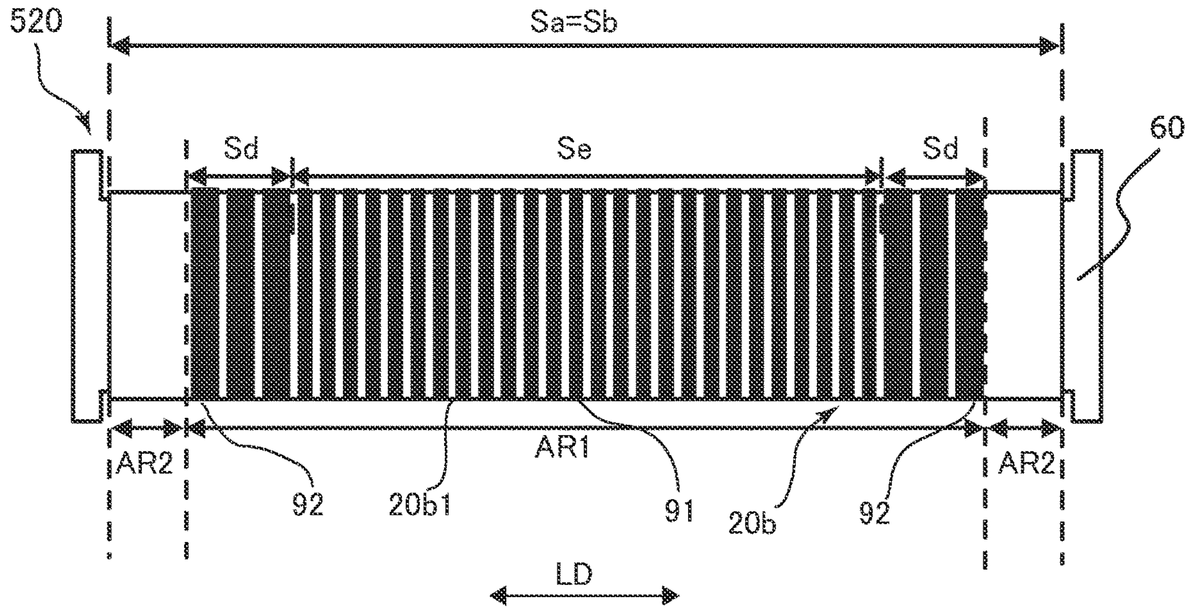
FIG. 11 is a diagram schematically illustrating a disconnection pattern of the conductive layer in a variant example 1 of the example 3.

When, as with the fixing film 520 illustrated in FIG. 11, the conductive element **20*b*1 is not disposed in the second area AR2, there is a possibility that the durability of the fixing film 520 may decrease due to a decrease in the breaking strength of the end portion in the longitudinal direction LD of the fixing film 520**.

Therefore, in the variant example 2 of the example 3, as illustrated in FIG. 12, after disposing the conductive elements **20*b*1 in the second area AR2, a notch 95 is provided on each of the conductive elements 20*b*1 in the second area AR2. By providing the notch 95 on the conductive element 20*b*1, the circulating current becomes not to flow through the conductive element 20*b*1, and, in the second area AR2 that is the no-sheet passing area, the conductive element 20*b*1 does not generate the heat. Therefore, while maintaining the durability of the fixing film 620, it is possible to suppress the temperature rise of the fixing film 620 in the second area AR2**.

Since the temperature rise in the no-sheet passing area of the fixing film changes due to such as the thermal conductivity and heat dissipation properties of a member, and a winding method of a coil, depending on configurations of fixing units, it is preferable to adopt the practice of providing the conductive elements with the notches at optimum positions and incorporating areas devoid of the conductive element.

Further, in the example 3, so as to prevent the uneven heat generation at a boundary where the width of the conductive element of the fixing film changes, or at a boundary between the no-sheet passing area and an area in which the conductive element exists, it is acceptable to gradually change the resistance of the conductive elements, as described in the example 2.

Other Embodiments

To be noted, while, in any of the examples described above, the winding density of the exciting coil 31 is constant, it is not limited to this. For example, it is acceptable to vary the winding density of the exciting coil 31 so as to uniformize the heating distribution in the longitudinal direction of the fixing film.

Further, in any of the examples described above, a configuration in which the alternating magnetic field for induction heating the conductive layer **20*b* of the fixing film is created by the exciting coil 31 inserted in the internal space of the fixing film is described. It is not limited to this, and it is acceptable to arrange an exciting coil, which generates the alternating magnetic field for induction heating the conductive layer 20*b* of the fixing film, in an external space of the fixing film. For example, in FIG. 2, it is acceptable to arrange the exciting coil 31 above the fixing film 20**.

Further, in any of the examples described above, it is acceptable to dispose another area between the central area (AR**1*a*, Se) and the end portion area (AR1*b*, Sd) of the first area AR1. A resistance value of each of a plurality of disconnected conductive elements 20*b*1** disposed in this another area may be set arbitrarily.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-211851, filed Dec. 28, 2022, which is hereby incorporated by reference herein in its entirety.

What is claimed is:

1. A fixing member configured to heat a toner image borne on a recording material and formed in a rotatable tubular shape, the fixing member comprising:

a conductive layer configured to generate heat by an induced electromotive force when an alternating magnetic field is created, the conductive layer including a plurality of conductive elements that are electrically disconnected each other in a direction of a generatrix of the fixing member, wherein, in the direction of the generatrix, when an area through which the recording material with a maximum width conveyable to the fixing member passes is referred to as a first area, the first area includes a central area and an end portion area, wherein the central area includes a central portion of the first area in the direction of the generatrix, wherein the end portion area includes an end portion of the first area in the direction of the generatrix, wherein a resistance value of each of the plurality of conductive elements disposed in the central area is a first resistance value, and wherein a resistance value of each of the plurality of conductive elements disposed in the end portion area is a second resistance value that is lower than the first resistance value.

2. The fixing member according to claim 1, wherein, when an area, of the fixing member, that is further outside than the first area in the direction of the generatrix is referred to as a second area, a resistance value of each of the plurality of conductive elements disposed in the second area is a third resistance value that is lower than the first resistance value.

3. The fixing member according to claim 2, wherein the third resistance value is the same as the second resistance value.

4. The fixing member according to claim 1, wherein, when an area, of the fixing member, that is further outside than the first area in the direction of the generatrix is referred to as a second area, a resistance value of each of the plurality of conductive elements disposed in the second area is higher than the second resistance value.

5. The fixing member according to claim 4, wherein the resistance value of each of the plurality of conductive elements disposed in the second area is the same as the first resistance value.

6. The fixing member according to claim 1, wherein, when an area that is further outside than the first area in the direction of the generatrix of the fixing member is referred to as a second area, the plurality of conductive elements are not disposed in the second area.

7. The fixing member according to claim 1, wherein, when an area, of the fixing member, that is further outside than the first area in the direction of the generatrix is referred to as a second area, a notch is disposed on each of the plurality of conductive elements disposed in the second area so as to prevent a flow of a circulating current.

8. The fixing member according to claim 1, wherein the end portion area is adjacent to the central area in the direction of the generatrix.

9. The fixing member according to claim 1, wherein the first area includes a plurality of areas divided in the direction of the generatrix, the plurality of areas being disposed between the central area and the end portion area in the direction of the generatrix, wherein each of the plurality of conductive elements belonging to the same area among the plurality of areas has the same resistance value that is smaller than the first resistance value and larger than the second resistance value, and wherein a resistance value of each of the plurality of conductive elements decreases from an area on a central side toward an area on an end portion side within the plurality of areas in the direction of the generatrix.

10. The fixing member according to claim 1, wherein, in the direction of the generatrix, a width of each of the plurality of conductive elements disposed in the end portion area is wider than a width of each of the plurality of conductive elements disposed in the central area.

11. The fixing member according to claim 1, wherein, in a thickness direction of the conductive layer intersecting the direction of the generatrix, a thickness of each of the plurality of conductive elements disposed in the end portion area is larger than a thickness of each of the plurality of conductive elements disposed in the central area.

12. The fixing member according to claim 1, wherein a volumetric electrical resistivity of each of the plurality of conductive elements disposed in the end portion area is smaller than a volumetric electrical resistivity of each of the plurality of conductive elements disposed in the central area.

13. The fixing member according to claim 1, wherein the fixing member includes a film.

14. A fixing unit comprising:

the fixing member according to claim 1;

a magnetic field generating unit configured to create the alternating magnetic field in the direction of the generatrix when an alternating current flows;

a nip portion forming member configured to slide along an inner surface of the fixing member; and a pressing member configured to form a nip portion with the nip portion forming member by being brought into contact with the nip portion forming member across the fixing member, wherein, while the recording material is being conveyed by being nipped by the fixing member and the pressing member in the nip portion, the toner image on the recording material is heated by the fixing member.

15. The fixing unit according to claim 14, wherein the magnetic field generating unit includes a magnetic member and a coil, wherein the magnetic member extends in the direction of the generatrix, and is inserted in an internal space of the fixing member, wherein the coil is formed in a helical shape along the direction of the generatrix by being wound around the magnetic member, and inserted in the internal space of the fixing member, wherein the alternating magnetic field is created when the alternating current flows through the coil, and wherein a magnetic flux density of an end portion of the magnetic member in the direction of the generatrix is lower than a magnetic flux density of a central portion of the magnetic member in the direction of the generatrix.

16. A fixing member configured to heat a toner image borne on a recording material and formed in a rotatable tubular shape, the fixing member comprising:

a conductive layer configured to generate heat by an induced electromotive force when an alternating magnetic field is created, the conductive layer including a plurality of conductive elements that are electrically disconnected each other in a direction of a generatrix of the fixing member, wherein, in the direction of the generatrix, when an area through which the recording material with a maximum width conveyable to the fixing member passes is referred to as a first area, a resistance value of each of the plurality of conductive elements disposed in the first area decreases from a central portion toward an end portion in the direction of the generatrix.

* * * * *